(12) United States Patent
Perera et al.

(10) Patent No.: US 11,709,915 B2
(45) Date of Patent: Jul. 25, 2023

(54) CLASSIFYING IMAGES UTILIZING GENERATIVE-DISCRIMINATIVE FEATURE REPRESENTATIONS

(71) Applicant: Adobe Inc., San Jose, CA (US)

(72) Inventors: Pramuditha Perera, Baltimore, MD (US); Vlad Morariu, Potomac, MD (US); Rajiv Jain, Vienna, VA (US); Varun Manjunatha, College Park, MD (US); Curtis Wigington, San Jose, CA (US)

(73) Assignee: Adobe Inc., San Jose, CA (US)

( * ) Notice: Subject to any disclaimer, the term of this patent is extended or adjusted under 35 U.S.C. 154(b) by 294 days.

(21) Appl. No.: 17/003,149

(22) Filed: Aug. 26, 2020

(65) Prior Publication Data

US 2022/0067449 A1 Mar. 3, 2022

(51) Int. Cl.
| | | |
|---|---|---|
| G06F 18/21 | (2023.01) | |
| G06F 18/214 | (2023.01) | |
| G06F 18/241 | (2023.01) | |
| G06F 11/32 | (2006.01) | |
| G06N 3/045 | (2023.01) | |

(52) U.S. Cl.
CPC ........ *G06F 18/2185* (2023.01); *G06F 11/327* (2013.01); *G06F 18/214* (2023.01); *G06F 18/241* (2023.01); *G06N 3/045* (2023.01)

(58) Field of Classification Search
None
See application file for complete search history.

(56) References Cited

U.S. PATENT DOCUMENTS

| | | | |
|---|---|---|---|
| 10,922,788 B1* | 2/2021 | Yu | G06N 3/088 |
| 11,341,699 B1* | 5/2022 | Gottlieb | G06K 9/6263 |
| 2019/0065892 A1* | 2/2019 | Xu | G06N 7/005 |
| 2022/0067449 A1* | 3/2022 | Perera | G06K 9/6256 |

OTHER PUBLICATIONS

Martin Arjovsky, Soumith Chintala, and Leon Bottou. Wasserstein generative adversarial networks. In Doina Precup and Yee Whye Teh, editors, Proceedings of the 34th In-ternational Conference on Machine Learning, vol. 70 of Proceedings of Machine Learning Research, pp. 214-223, International Convention Centre, Sydney, Australia, Aug. 6-11, 2017. PMLR.
(Continued)

*Primary Examiner* — Tahmina N Ansari
(74) *Attorney, Agent, or Firm* — Keller Preece PLLC

(57) ABSTRACT

The present disclosure relates to systems, non-transitory computer-readable media, and methods for classifying an input image utilizing a classification model conditioned by a generative model and/or self-supervision. For example, the disclosed systems can utilize a generative model to generate a reconstructed image from an input image to be classified. In turn, the disclosed systems can combine the reconstructed image with the input image itself. Using the combination of the input image and the reconstructed image, the disclosed systems utilize a classification model to determine a classification for the input image. Furthermore, the disclosed systems can employ self-supervised learning to cause the classification model to learn discriminative features for better classifying images of both known classes and open-set categories.

20 Claims, 13 Drawing Sheets

(56) References Cited

OTHER PUBLICATIONS

Abhijit Bendale and Terrance Boult. Towards open world recognition. In The IEEE Conference on Computer Vision and Pattern Recognition (CVPR), Jun. 2015.
Abhijit Bendale and Terrance E. Boult. Towards open set deep networks. In The IEEE Conference on Computer Vision and Pattern Recognition (CVPR), Jun. 2016.
J. Deng, W. Dong, R. Socher, L.-J. Li, K. Li, and L. FeiFei. ImageNet: A Large-Scale Hierarchical Image Database. In The IEEE Conference on Computer Vision and Pattern Recognition (CVPR), 2009.
Carl Doersch, Abhinav Gupta, and Alexei A. Efros. Unsupervised visual representation learning by context prediction. In Proceedings of the 2015 IEEE International Conference on Computer Vision (ICCV), ICCV'15, pp. 1422-1430, 2015.
Carl Doersch and Andrew Zisserman. Multi-task self-supervised visual learning. In The IEEE International Conference on Computer Vision (ICCV), Oct. 2017.
Zongyuan Ge, Sergey Demyanov, and Rahil Garnavi. Generative openmax for multi-class open set classification. In British Machine Vision Conference 2017, BMVC 2017, Lon-don, UK, Sep. 4-7, 2017, 2017.
Spyros Gidaris, Praveer Singh, and Nikos Komodakis. Unsupervised representation learning by predicting image rotations. In 6th International Conference on Learning Representations, ICLR 2018, Vancouver, BC, Canada, Apr. 30-May 3, 2018, Conference Track Proceedings, 2018.
Izhak Golan and Ran El-Yaniv. Deep anomaly detection using geometric transformations. In S. Bengio, H. Wallach, H. Larochelle, K. Grauman, N. Cesa-Bianchi, and R. Garnett, editors, Advances in Neural Information Processing Systems 31, pp. 9758-9769. Curran Associates, Inc., 2018.
Matthias Hein, Maksym Andriushchenko, and Julian Bitterwolf. Why relu networks yield high-confidence predictions far away from the training data and how to mitigate the problem. In The IEEE Conference on Computer Vision and Pattern Recognition (CVPR), Jun. 2019.
Dan Hendrycks and Kevin Gimpel. A baseline for detecting misclassified and out-of-distribution examples in neural networks. In 5th International Conference on Learning Representations, ICLR 2017, Toulon, France, Apr. 24-26, 2017, Conference Track Proceedings, 2017.
Alex Krizhevsky, Vinod Nair, and Geoffrey Hinton. Cifar-10 (Canadian institute for advanced research).
Alex Krizhevsky, Vinod Nair, and Geoffrey Hinton. Cifar-100 (Canadian institute for advanced research).
Shiyu Liang, Yixuan Li, and R Srikant. Enhancing the reliability of out-of-distribution image detection in neural networks. International Conference on Learning Representations (ICLR), 2018.
Lawrence Neal, Matthew Olson, Xiaoli Fern, Weng-Keen Wong, and Fuxin Li. Open set learning with counterfactual images. In The European Conference on Computer Vision (ECCV), Sep. 2018.
Yuval Netzer, Tao Wang, Adam Coates, Alessandro Bissacco, Bo Wu, and Andrew Y. Ng. Reading digits in natural images with unsupervised feature learning. In NIPS Workshop on Deep Learning and Unsupervised Feature Learning. 2011.
P. Oza and V. M. Patel. Active authentication using an autoencoder regularized cnn-based one-class classifier. In 2019 14th IEEE International Conference on Automatic Face Ges-ture Recognition (FG 2019), pp. 1-8, 2019.
Poojan Oza and Vishal M. Patel. C2ae: Class conditioned auto-encoder for open-set recognition. In The IEEE Conference on Computer Vision and Pattern Recognition (CVPR), Jun. 2019.
Poojan Oza and Vishal M Patel. One-class convolutional neural network. IEEE Signal Processing Letters, 26(2):277-281, 2019.
Pramuditha Perera, Ramesh Nallapati, and Bing Xiang. Ocgan: One-class novelty detection using gans with constrained latent representations. In The IEEE Conference on Computer Vision and Pattern Recognition (CVPR), Jun. 2019.
Pramuditha Perera and Vishal M. Patel. Deep transfer learning for multiple class novelty detection. In The IEEE Conference on Computer Vision and Pattern Recognition (CVPR), Jun. 2019.
Pramuditha Perera and Vishal M. Patel. Face-based multiple user active authentication on mobile devices. IEEE Transactions on Information Forensics and Security, 14(5):1240-1250, 2019.
Pramuditha Perera and Vishal M. Patel. Learning deep features for one-class classification. IEEE Transactions on Im-age Processing, 28(11):5450-5463, 2019.
Antti Rasmus, Mathias Berglund, Mikko Honkala, Harri Valpola, and Tapani Raiko. Semi-supervised learning with ladder networks. In C. Cortes, N. D. Lawrence, D. D. Lee, M. Sugiyama, and R. Garnett, editors, Advances in Neural Information Processing Systems 28, pp. 3546-3554. Curran Associates, Inc., 2015.
Walter J. Scheirer, Anderson Rocha, Archana Sapkota, and Terrance E. Boult. Towards open set recognition. IEEE Transactions on Pattern Analysis and Machine Intelligence (T-PAMI), 35, Jul. 2013.
Laurens van der Maaten and Geoffrey Hinton. Visualizing data using t-SNE. Journal of Machine Learning Research, 9:2579-2605, 2008.
Yan Xia, Xudong Cao, Fang Wen, Gang Hua, and Jian Sun. Learning discriminative reconstructions for unsupervised outlier removal. In The IEEE International Conference on Computer Vision (ICCV), Dec. 2015.
Ryota Yoshihashi, Wen Shao, Rei Kawakami, Shaodi You, Makoto Iida, and Takeshi Naemura. Classification-reconstruction learning for open-set recognition. In The IEEE Conference on Computer Vision and Pattern Recognition (CVPR), Jun. 2019.
Fisher Yu, Yinda Zhang, Shuran Song, Ari Seff, and Jianxiong Xiao. Lsun: Construction of a large-scale image dataset using deep learning with humans in the loop. arXiv preprint arXiv:1506.03365, 2015.
Sergey Zagoruyko and Nikos Komodakis. Wide residual networks. In BMVC, 2016.
H. Zhang and V. M. Patel. Sparse representation-based open set recognition. IEEE Transactions on Pattern Analysis and Machine Intelligence, 39(8):1690-1696, 2017.

\* cited by examiner

CLASSIFYING IMAGES UTILIZING GENERATIVE-DISCRIMINATIVE FEATURE REPRESENTATIONS

BACKGROUND

Recent years have seen significant improvements in computer vision and related tasks. For example, utilizing deep learning models, computer vision systems are able to identify and classify objects within digital images and videos. In order to classify objects, computer vision systems typically learn a descriptive feature space based on a finite set of labeled training examples from a set of known classes. Unfortunately, when provided an image with an object outside of the known class set (i.e., an open-set object), most conventional computer vision systems will classify the open-set object as one of the known classes because there are no classification options beyond the known classes. Even for systems that do have an open-set classification option, misclassification errors, such as misclassification of open-set objects, can still occur. Often such misclassification errors occur as a result of limitations associated with learning the descriptive feature space. Conventional computer vision systems suffer from these and other technological shortcomings.

BRIEF SUMMARY

Embodiments of the present disclosure include systems, non-transitory computer-readable media, and methods that provide increased classification accuracy, particularly for open-set recognition, by utilizing generative-discriminative feature representations to classify objects. More specifically, one or more embodiments learn a richer, deeper feature space utilizing a generative model and/or self-supervision, which allows the disclosed systems to more accurately distinguish features from learned classifications and open-set categories. For example, the disclosed systems utilize a generative model, which has learned to generate reconstructions (e.g., reconstructed input images) of known classes, to generate input for a classification model. The classification model processes the image reconstructions and takes into account any disparity between the input image and the image reconstruction, which enables accurate detection of open-set objects due to an associated higher disparity. Furthermore, one or more embodiments utilize self-supervision to help the classification model to learn more discriminative features when assigning class scores to improve the separation of classes from each other and from open-set examples.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1A:
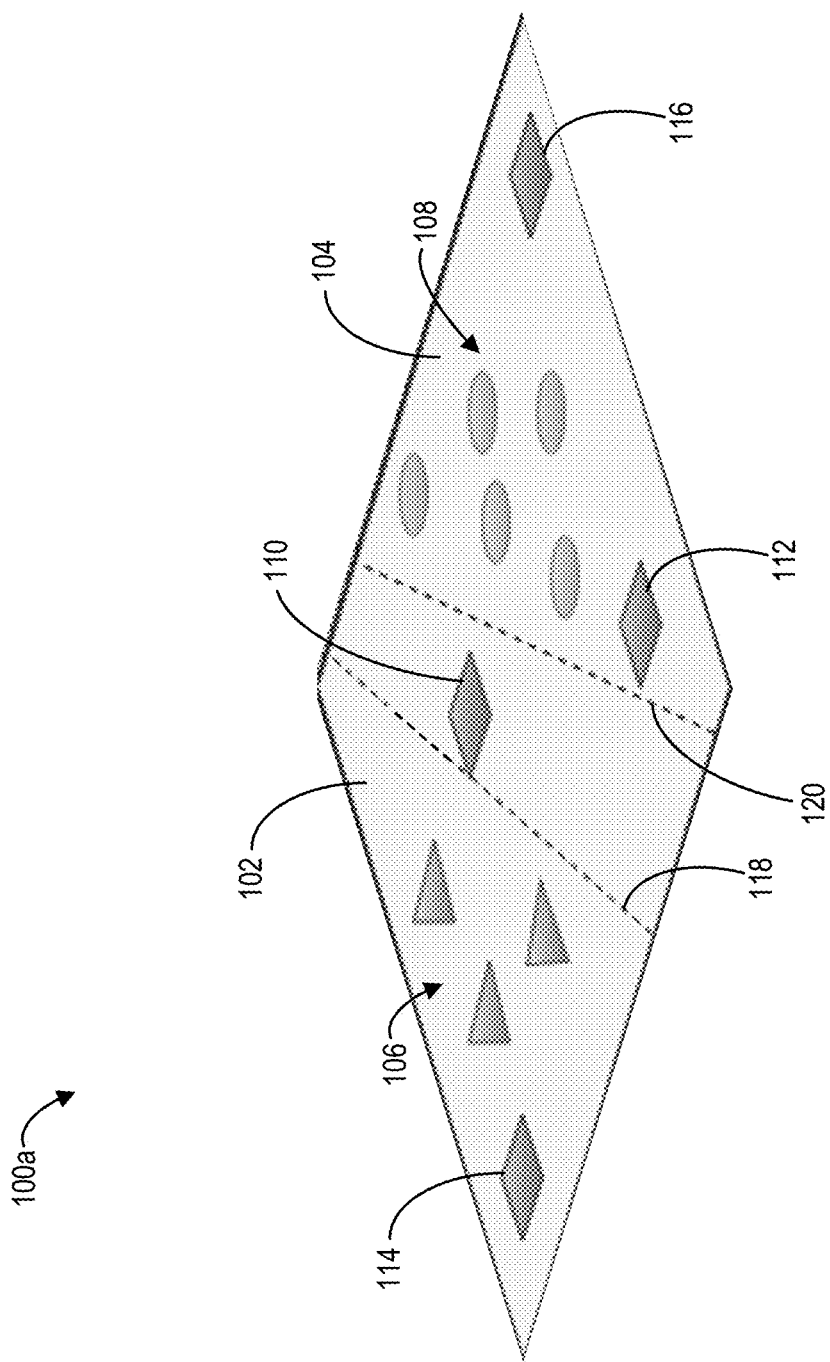
FIG. 1A illustrates a simplified representation of a feature space generated by a conventional classification system.

One or more embodiments described herein include a generative-discriminative image-classification system that disentangles open-set images that produce high class-activations from known set images to increase classification accuracy. More specifically, one or more embodiments of the generative-discriminative image-classification system utilize one or more of a generative technique and a self-supervision technique to learn discriminative features for classification that force class activations to be low for open-set images. Thus, one or more embodiments increase the accuracy of both open-set detection and known class detection.

In particular, with regard to the generative technique, one or more embodiments use a generative model to generate an image reconstruction of an input image. In one or more embodiments, the generative model is trained to reconstruct images of known classes and not open-set images. As such, the generative model generates more accurate reconstructions of images of known classes compared to images of unknown classes. The generative-discriminative image-classification system then utilizes a classification model to process a combination of an input image and a corresponding reconstructed image to generate probabilities that the input image corresponds to a classification of one of a known set of classifications. More particularly, the generative-discriminative image-classification system utilizes a classification model that has learned to associate high classification probabilities with an input image when the input image is both from a known class as well as when the reconstructed image is consistent with the input image.

Additionally, with regard to the self-supervision technique, one or more embodiments use self-supervision to learn discriminative features to improve classification of both known class images and open-set images. More particularly, one or more embodiments utilize self-supervision to cause the classification model to learn features that capture one or more of shapes, structure, or semantics of known-class images. By learning such discriminative features, the classification model maps images of known classes away from each other and away from open-set images within the deep feature space. Such a robust deep feature space allows the generative-discriminative image-classification system to more accurately classify known class images and more easily recognize open-set images.

As mentioned above, in one or more embodiments, the generative-discriminative image-classification system utilizes a generative model to enable more accurate classification, particularly of open-set images. More specifically, the generative-discriminative image-classification system utilizes a generative model (e.g., a generative adversarial neural network (GAN), an autoencoder) to generate a reconstructed image. For example, the generative-discriminative image-classification system utilizes the generative model to encode the input image into a deep feature space. The generative-discriminative image-classification system then utilizes the generative model to decode the encoding to regenerate the input image.

In one or more embodiments, the generative-discriminative image-classification system trains the generative model utilizing only (or substantially only) known class images. More specifically, the generative-discriminative image-classification system learns parameters for the generative model by reconstructing images of known classes. In other words, in one or more embodiments, the generative-discriminative image-classification system does not use open-set images when training the generative model. In this manner, the generative-discriminative image-classification system configures the generative model to generate more accurate reconstructions of known class images compared to open-set images.

Having generated the reconstructed image, the generative-discriminative image-classification system utilizes the reconstructed image to aid in classifying the input image. For example, the generative-discriminative image-classification system generates an input combination by augmenting the input image with the reconstructed image. The generative-discriminative image-classification system then utilizes a classification model to process the input combination to determine a classification for the input image. In particular, the generative-discriminative image-classification system utilizes the classification model to generate a classification score indicating a probability that the input image belongs to each known class. When generating the classification scores, the classification model considers how well the reconstructed image corresponds to the input image and generates higher scores when discriminative features extracted from the input image map to a known class and when the reconstructed image closely resembles the input image. As open-set images produce higher disparity than known class images, the use of the reconstructed image allows the classification model to better detect when the input image is an open-set image. Specifically, if none of the classification scores meet a predetermined threshold, the generative-discriminative image-classification system determines that the input image corresponds to an open-set category.

As mentioned above, in one or more embodiments, the generative-discriminative image-classification system utilizes self-supervision to enable a classification model to perform more accurate image classification. In one or more embodiments the generative-discriminative image-classification system utilizes self-supervision to help the classification model learn which deep features are discriminative or more informative to the classification task. In particular, when training the classification model, the generative-discriminative image-classification system applies a transformation from a set of transformations to an input image. The generative-discriminative image-classification system uses a self-supervision branch to predict which transformation was applied to the input image and a classification branch to predict the classification of the input image.

Based on a comparison of a transformation prediction and the applied random transformation, the generative-discriminative image-classification system determines a self-supervision loss. Further, the generative-discriminative image-classification system determines a classification loss based on a comparison of a predicted classification and a ground truth classification. Subsequently, the generative-discriminative image-classification system combines (e.g., in a weighted manner) the classification loss and the self-supervision loss when updating one or more parameters of the classification model.

In order to accurately predict which transformation was applied to the input image, the classification model learns structural properties of the image content, such as shape and orientation that the classification model would not learn only training on the classification task. As such, the use of self-supervision causes the classification model to learn a more robust deep feature space. The robust deep feature space allows the classification model to map images of different known classes away from which other while at the same time mapping open-set images away from images of known classes. The increased separation in the deep feature space, allows the classification model to more accurately identify images of known classes and open-set images.

As briefly mentioned above, a number of technical problems exist with conventional classifications systems with regard to accuracy, system errors, and flexibility. For example, conventional classifications systems tend to suffer from decreased accuracy for certain types of sample images. Specifically, for some types of sample images, conventional systems can often be tricked into wrongfully classifying a sample image as corresponding to a particular classification among k-learned classifications. In particular, some images can share a great deal of features in common with one or more learned classifications. Where there is such an overlap in features, a sample image using conventional systems can indicate sufficiently high classification scores to trigger an incorrect classification among the k-learned classifications. Thus, conventional systems can inaccurately classify some input images that should correspond to an open-set category.

In addition to decreased classification accuracy, conventional systems also cause increased system-response errors. For example, after classifying a sample image, conventional systems performs one or more responsive actions based on the classification of the sample image (e.g., transmit a message to a certain device, store the sample image in a particular memory space, etc.). Accordingly, conventional systems cause, for implementing computing systems, increased system errors that percolate from incorrect image classifications. These system errors can, in turn, lead to a variety of technical problems for conventional systems in relation to identifying and resolving the errors, etc. To illustrate, conventional systems may employ additional error detection systems (and therefore additional processing overhead) designed to mitigate the spread of system errors from incorrect image classifications. Similarly, conventional systems may employ additional error resolution systems that send communications to effected devices, relocate incorrectly stored images to undo incorrect actions and perform correct actions. Accordingly, conventional systems may implement a number of system redundancies that involve extra processing overhead, extra transmissions of digital communications, and the like.

Further, conventional systems may also suffer from decreased classification flexibility. As mentioned above, some conventional classification systems may be trained to only recognize k-learned classifications. Thus, when analyzing an open-set image, a conventional system may nevertheless associate the open-set image with one of the k-learned classifications. In other cases, a conventional system may include open-set recognition capabilities. However, with the increased flexibility of open-set recognition, these conventional systems may sacrifice system flexibility on the training side (e.g., by requiring classification labels, increased training iterations, etc.). Accordingly, conventional systems fail to classify (and/or facilitate classification training of) input images in a flexible, user-friendly manner.

As mentioned above, conventional systems have various drawbacks, particularly in relation to distinguishing between open-set images and images of known classifications. Conventional classification systems typically utilize a finite set of labeled examples (e.g., images with an associated known class) when training. More particularly, conventional classification system utilize training data from k distinct known classes. In such instances, a neural network classification model simultaneously learns a descriptive feature space and a decision rule that segments the feature space into k non-overlapping regions. FIG. 1A illustrates a simplified diagram of a feature space $100a$ of a conventional classification system. As shown in FIG. 1A, the conventional system generates the feature space $100a$ such that image representations 106-116 (vectors of deep features extracted from the images) project onto regions associated with known classes 102, 104 or outside regions associated with the known classes 102, 104 according to learned decision boundaries 118, 120. Typically, conventional classification systems define a positive half space (e.g., region 102 or 104) for each known class by considering only class separation. In other words, conventional classification systems typically learn a set of features that are needed to distinguish between images of the known classes. Often conventional classification systems will discard features during the learning process that do not aid in distinguishing images of the known classes (referred herein as optional closed-set features).

In the illustrative feature space $100a$ of FIG. 1A, the triangular-shaped image representations 106 correspond to images of the known class 102. Similarly, the circular image representations 108 correspond to images of the known class 104. The square-shaped image representations 110-116 correspond to images from an open-set category.

When the conventional classification system identifies an image representation that projects outside of the regions associated with the known classes 102, 104, the conventional classification system can identify the image as belonging to an open-set category. However, conventional classification systems often project open-set images 110-116 near a decision boundary (e.g., representations 110, 112) or deep into the positive half space associated with a known class (e.g., representations 114, 116). The conventional classification system may have difficulty correctly identifying the images corresponding to the image representations 112-116 as belonging to an open-set category because the image representations 112-116 project into the regions of the feature space of the known classes 102, 104.

Indeed, when an open-set image has a semantically similar component/region to that of a known class (or the classification system perceives so), the conventional classification system will generate an image representation deep into the positive half space of a known class. For example, the image representations 114, 116 project deep into the respective feature spaces associated with the known classes 102, 104 and have high class activations despite being from open-set images. As a result, the conventional classification system cannot properly classify these open-set images. Indeed, the images corresponding to the image representations 114-116 can easily trick the conventional classification system into identifying these images as belonging to the known classes 102, 104.

One or more embodiments of the generative-discriminative image-classification system described herein overcomes the foregoing shortcomings and otherwise provides improvements over conventional classification systems. For example, in one or more embodiments, the generative-discriminative image-classification system increases classification accuracy of input images by reducing or eliminating high class activations for open-set images via a more robust deep feature space learned via conditioning the classification model on one or more of a generative model or utilizing self-supervision.

Figure 1B:
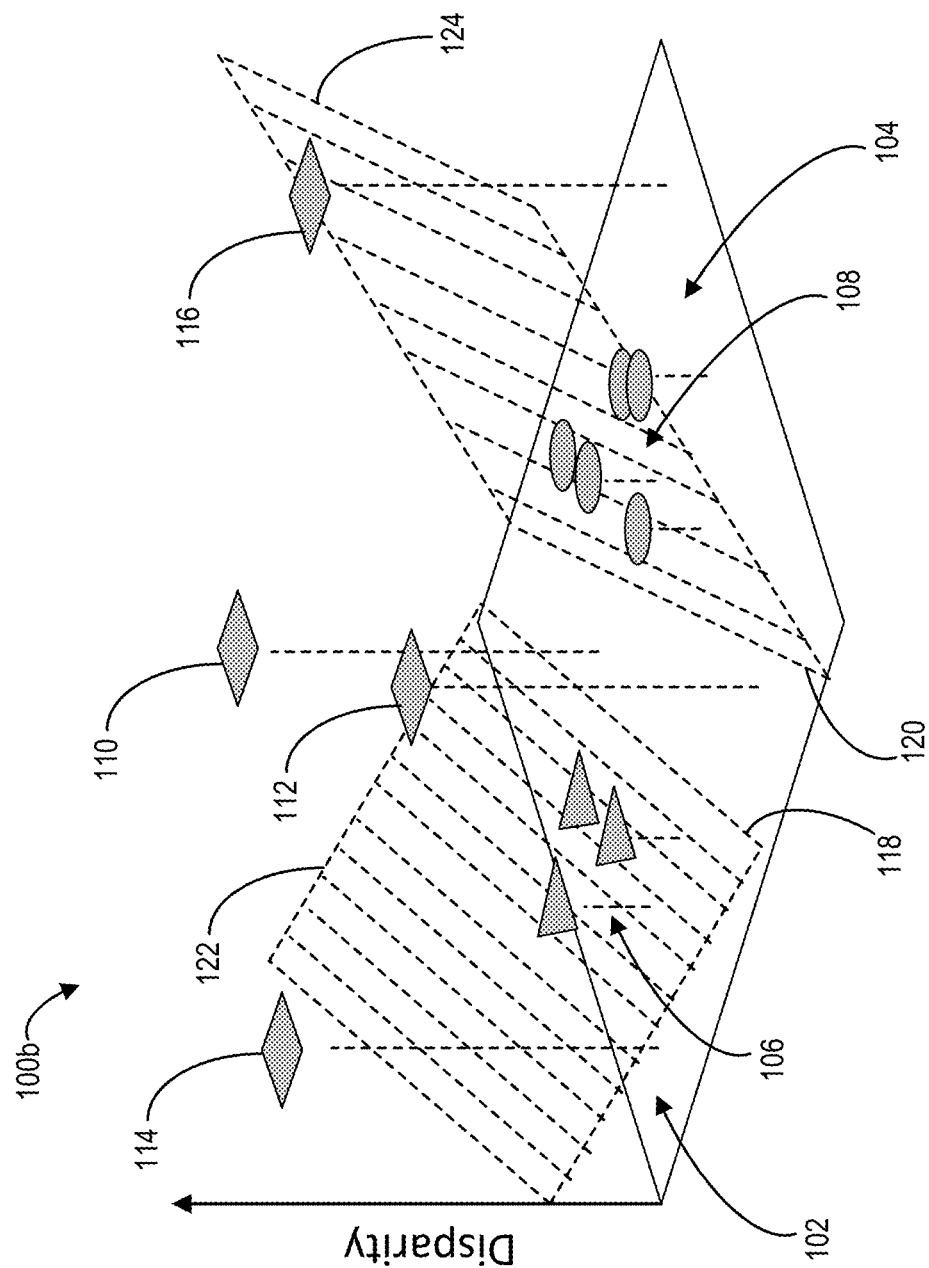
FIG. 1B illustrates a simplified representation of a generative-discriminative feature space in accordance with one or more embodiments.

FIG. 1B illustrates a simplified schematic of an augmented feature space $100b$ learned by the generative-discriminative image-classification system in accordance with one or more embodiments. As shown in FIG. 1B, the generative-discriminative image-classification system generates the augmented feature space $100b$ such that the image representations 106-116 fall inside or outside of a regions associated with the known classes 102, 104 according to learned decision boundaries 118-124. In particular, the generative-discriminative image-classification system generates the augmented feature space $100b$ by conditioning a classification model on augmented input images (e.g., input combinations comprising both an input image and a reconstructed input image generated via a generative model) as described below in relation to FIGS. 3-6.

Moreover, during interference, the generative-discriminative image-classification system takes into consideration a correspondence between an input image and a reconstructed image of the input image. Compared to input images of known classes, input images of an open-set category will lead to greater disparity with a corresponding reconstructed image (e.g., due to the generative model learning to reconstruct images of known classes). In the simplified augmented feature space $100b$ shown in FIG. 1B, the disparity between input images and associated reconstructed images are denoted by an additional axis. As discussed above, disparities for images of known classes are smaller compared to disparities for images of open-set classes. As shown, the classification model learns two new positive half planes 122, 124 defined by hyper-planes. When the disparity is high, the classification model forces encodings of open-set images to be outside the positive half space of all of the known classes.

Accounting for such disparity as shown in FIG. 1B, the generative-discriminative image-classification system imparts greater feature-space separation between the image representations 110-116 of an open-set images regions of the augmented feature space corresponding to the known classes 102, 104. As shown, the greater disparity associated with open-set images helps ensure that image representations 110-116 extracted from the open-set images are projected outside the positive half spaces associated with the known classes. With greater feature-space separation, the generative-discriminative image-classification system lowers classification scores for input images that correspond to an open-set category, and thereby, more accurately classifies input images. Thus, by imparting better feature separation, the generative-discriminative image-classification system reduces false-positive classifications of open-set images.

Additionally, the generative-discriminative image-classification system improves accuracy by extending optional closed-set features so that the features have the capacity to encode shapes, structure, and semantics of known class objects. By so doing, the generative-discriminative image-classification system ensures that the classification model considers overall semantics of images (not just discriminative features) when class decision boundaries are defined. As a result, the generative-discriminative image-classification system does not project open-set images in any of the positive half-spaces associated with known classes based on the having different semantics.

In addition to the foregoing, the generative-discriminative image-classification system improves the functioning of implementing computer systems by decreasing system-response errors. In particular, implementing computer systems of the generative-discriminative image-classification system can more efficiently operate by reducing the processing overhead of conventional systems that employ additional error detection systems and/or error resolution systems mentioned above. For example, the generative-discriminative image-classification system allows implementing computer systems to more efficiently utilize a classified image in the correct manner without corrective actions to, for instance, relocate classified images that are improperly stored. Accordingly, the generative-discriminative image-classification system allows implementing computer systems to operate with less processing overhead, improved system bandwidth, and the like.

Further, the generative-discriminative image-classification system in some embodiments improves classification flexibility. For example, rather than being limited to identifying k-learned classifications, the generative-discriminative image-classification system correctly classifies open-set images as being open-set images. Accordingly, the generative-discriminative image-classification system can improve classification flexibility beyond a predetermined number of classifications.

Figure 2:
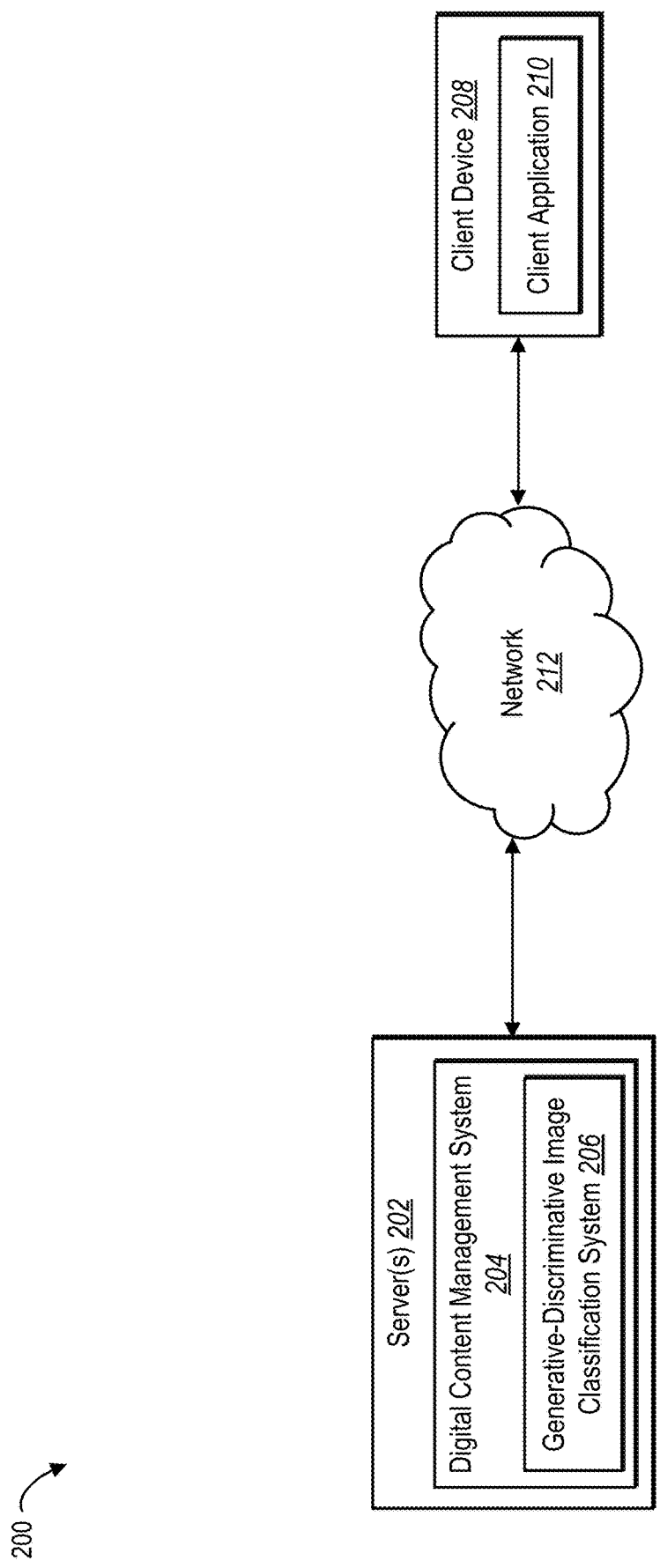
FIG. 2 illustrates a diagram of a computing system environment including a generative-discriminative image-classification system in accordance with one or more embodiments.

Additional detail will now be provided regarding the generative-discriminative image-classification system in relation to illustrative figures portraying example embodiments and implementations of the generative-discriminative image-classification system. For example, FIG. 2 illustrates a computing system environment (or "environment") 200 for implementing a generative-discriminative image-classification system 206 in accordance with one or more embodiments. As shown in FIG. 2, the environment 200 includes server(s) 202, a client device 208, and a network 212. Each of the components of the environment 200 communicate via the network 212. The network 212 comprises any suitable network over which computing devices can communicate. Example networks are discussed in more detail below in relation to FIG. 12.

As shown in FIG. 2, the environment 200 includes the client device 208. In some embodiments, the client device 208 is one of a variety of computing devices, including a smartphone, tablet, smart television, desktop computer, laptop computer, virtual reality device, augmented reality device, or other computing device as described in relation to FIG. 12. Although FIG. 2 illustrates a single client device 208, in some embodiments the environment 200 includes multiple client devices 208. The client device 208 further communicates with the server(s) 202 via the network 212. For example, the client device 208 receives user input and provide data corresponding to the user input (e.g., that relates to a query image for classification) to the server(s) 202.

As shown, the client device 208 includes a corresponding client application 210. In some embodiments, the client application 210 comprises one of a web application, a native application installed on the client device 208 (e.g., a mobile application, a desktop application, etc.), or a cloud-based application where part of the functionality is performed by the server(s) 202. The client application 210 presents or displays information to a user associated with the client device 208, including information that is responsive to a classification query. In addition, the user can interact with the client application 210 to provide user input to, for example, access classification results and/or recommendations in response to a previous user input comprising a query image for classification. Additionally or alternatively, the client application 210 is configured to present one or more interfaces in response to classification of a query image, including interfaces that may be unrelated (or indirectly related) to the classification of a query image (e.g., a presentation of a website, message thread, digital storage folder, etc.). That is, the client application 210, in one or more implementations, presents a particular user interface that is in response to the generative-discriminative image-classification system 206 classifying an image according to a certain classification without actually displaying the image classification and/or the image itself.

As illustrated in FIG. 2, the environment 200 includes the server(s) 202. In some embodiments, the server(s) 202 comprises a content server and/or a data collection server. The server(s) 202 can also comprise an application server, a communication server, a web-hosting server, a social networking server, or a digital content management server. For example, the server(s) 202 learn, generate, store, receive, and transmit electronic data, such as executable instructions for generating a reconstructed image from an input image, generating an input combination by combining the reconstructed image and the input image, and determining a classification for the input image by processing the input combination. For example, the server(s) 202 receive data from the client device 208 based on user input to provide a query image to be classified. In turn, the server(s) 202 in some embodiments transmit corresponding data and/or relay the query image to one or more components in the environment 200. For example, the server(s) 202 provide the query image to the generative-discriminative image-classification system 206 for classification. Further, the server(s) 202 in some embodiments send to the client device 208 a classification of the query image, including a classification of a set of known classifications or a classification of an open-set category.

Although FIG. 2 depicts the generative-discriminative image-classification system 206 located on the server(s) 202, in some embodiments, the generative-discriminative image-classification system 206 may be implemented by one or more other components of the environment 200 (e.g., by being located entirely or in part at one or more of the other components). For example, generative-discriminative image-classification system 206 in some embodiments are implemented by the client device 208 and/or a third-party device.

As shown in FIG. 2, the generative-discriminative image-classification system 206 is implemented as part of a digital content management system 204 located on the server(s) 202. The digital content management system 204 in some embodiments organizes, manages, and/or executes handling of query images. For example, the digital content management system 204 identifies classification queries for directing to the generative-discriminative image-classification system 206 to respond accordingly. As an additional example, the digital content management system 204 sends image classification data to one or more components of the environment 200 (e.g., for generating tags and/or providing content to send to the client device 208 via the network 212).

In some embodiments, though not illustrated in FIG. 2, the environment 200 may have a different arrangement of components and/or may have a different number or set of components altogether. For example, the environment 200 in some embodiments includes a third-party server (e.g., for storing image classification data or other data). As another example, the client device 208 may communicate directly with the generative-discriminative image-classification system 206, bypassing the network 212.

Figure 3:
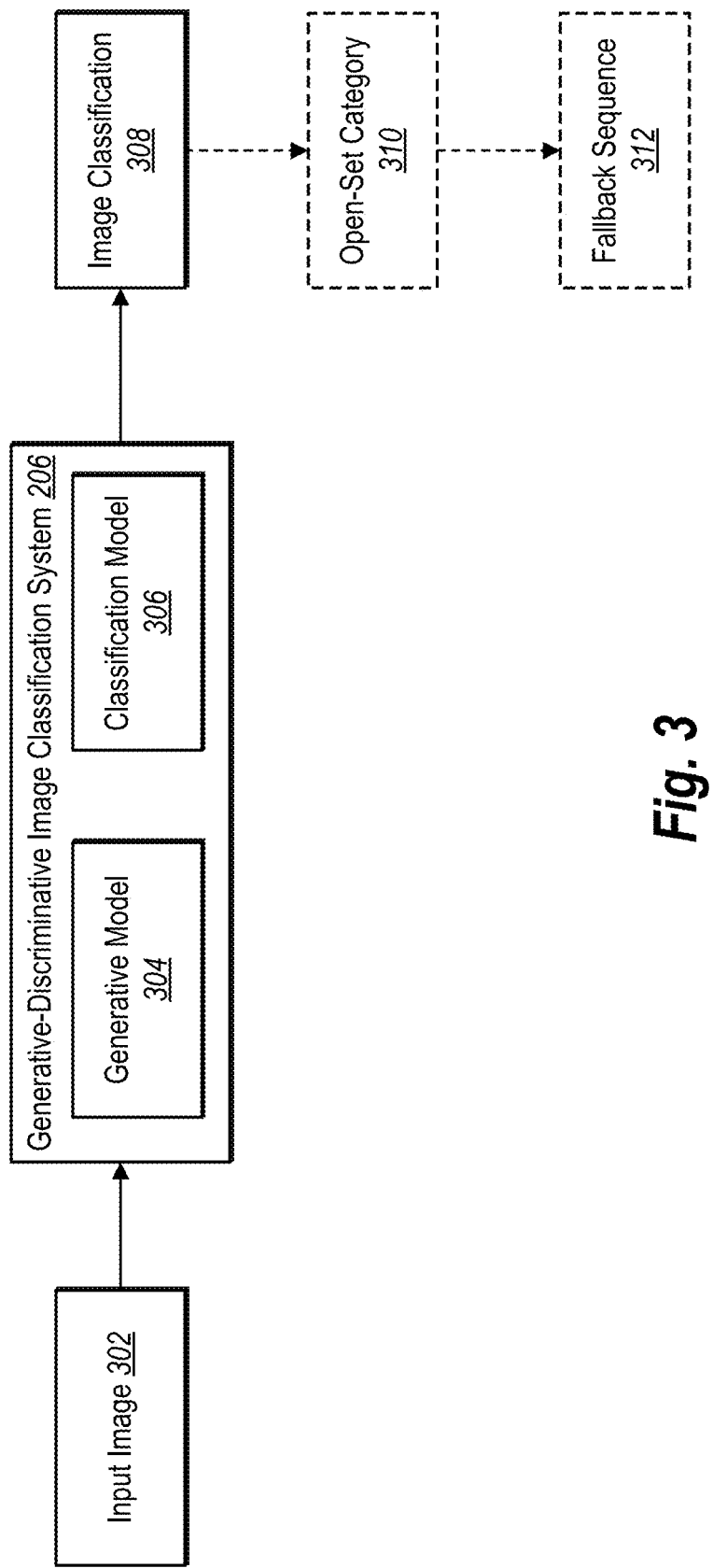
FIG. 3 illustrates an overview of a process of a generative-discriminative image-classification system classifying an input image in accordance with one or more embodiments.

As discussed above, the generative-discriminative image-classification system 206, in one or more embodiments, utilizes a generative model to condition a classification model to improve image classification. FIG. 3 illustrates the generative-discriminative image-classification system 206 classifying an input image 302 utilizing a generative model 304 and a classification model 306 in accordance with one or more embodiments. The input image 302 can comprise a digital image with image content that depicts one or more objects.

The generative model 304 includes one or more algorithms that encode an input image 302 into an image representation (also referred to as an encoding or feature embedding). The generative model 304 also includes one or more algorithms that decode an image representation into a reconstructed image (e.g., a rendered image). In other words, the generative model 304 can encode and then generate a reconstructed image (reconstruction of an input image 302) from the encoding. In one or more embodiments, a reconstructed image is a lower quality version of the input image, such as a blurred version of the input image. As such, in one or more embodiments, the generative model 304 includes an encoder and a decoder. More specifically, in one or more embodiments, the generative model 304 comprises one or more neural network layers configured to deconstruct and then reconstruct an input image. For example, the generative model 304 can comprise a deep auto-encoder network (e.g., a variational autoencoder), a conditioned autoencoder, a generative adversarial network (GAN), a deep convolutional GAN, or a Wasserstein GAN, etc.

The classification model 306 includes one or more algorithms that encode an input (e.g., an input image 302 or a combination of an input image and a reconstructed input image) into an image representation (also referred to as an encoding or feature embedding). The classification model 306 also includes one or more algorithms that generate an image classification from an image representation. More specifically, in one or more embodiments, the classification model 306 comprises one or more neural network layers configured to encode and then classify an input image. For example, the classification model 306 can comprise a convolutional neural network, a wide residual network (WRN) such as a WRN28-10, or other suitable classification models.

For example, to generate an image classification 308 for the input image 302, the generative-discriminative image-classification system 206 utilizes the generative model 304 to intelligently encode deep features from the input image 302 in a vector embedding. Subsequently, the generative model 304 decodes the vector embedding to pictorially regenerate the input image 302. Moreover, as mentioned above, the generative model 304 may better represent (reproduce) the input image 302 in the form of a reconstructed image if the input image 302 corresponds to a known classification. Since the generative model 304 is trained on images of known classifications (e.g., as described more below in relation to FIG. 5), the generative model 304 in some embodiments imparts a greater disparity between the reconstructed image and the input image 302 in scenarios where the input image 302 corresponds to an open-set category.

The generative-discriminative image-classification system 206 then combines the input image 302 with the reconstructed image to generate an input combination. The generative-discriminative image-classification system 206 then utilizes the classification model 306 to generate a classification for the input image 302 based on the input combination. In particular, the generative-discriminative image-classification system 206 encodes the input combination into a vector embedding. Based on the vector embedding of the input combination, the classification model 306 generates a classification score for each known classification. In so doing, the classification model 306 accounts for any disparity between the input image 302 and the image reconstruction. Optionally, the classification model 306 also leverages a more robust feature space learned using self-supervision techniques described below in relation to FIG. 6). In any event, the classification model 306 generates a plurality of classification scores based on the vector embedding of the input combination.

The generative-discriminative image-classification system 206 determines an image classification 308 for the input image 302 based on the classification scores. The image classification 308 comprises an identification, label, or descriptive term for an image or object(s) portrayed in a digital image. As an example, an image classification 308 for a digital image depicting an angus cow may include image classifications of "animal," "black," "cow," and/or "angus." In one or more embodiments, the image classification 308 comprises an indication of one of a set of known classes, categories, or labels or an open-set indication.

Relatedly, a classification score or classification probability is a likelihood that a digital image corresponds to a given image classification 308. For instance, a classification score comprises a SoftMax score/probability, a class activation score, etc. In some embodiments, the classification model 306 generates a classification score for each known image classification as a number between 0 and 1.0 that indicates the probability or likelihood that the image corresponds to the given image classification. In determining the image classification 308 from a set of classification scores, in one or more embodiments, the classification model 306 utilizes a predetermined threshold. For example, the generative-discriminative image-classification system compares the classification score or the classification probability for a digital image with a predetermined threshold (e.g., a classification score value or classification probability metric such as 80%) to determine a corresponding image classification. For example, if a classification score meets or satisfies (e.g., is greater than or equal to) a predetermined threshold, then an image classification corresponding to the classification score may constitute (or qualify as a potential) image classification for an input image.

The generative-discriminative image-classification system 206 determines the image classification 308 is a known classification based on the highest classification score satisfying a predetermined threshold. In other embodiments, when none of the plurality of classification scores satisfy the predetermined threshold, the generative-discriminative image-classification system 206 determines that the image classification 308 corresponds to an open-set category 310 (i.e., an unknown classification). The open-set category 310 can indicate an input image 302 that does not correspond to any known image classification (e.g., includes an unrecognized or novel object). For example, a classification model 306 trained to provide classifications for digital images comprising dogs and cats, an input image comprising an airplane (a novel object based on the known image classifications) would correspond to an open-set category.

In one or more embodiments, in response to determining that the image classification 308 for the input image 302 corresponds to the open-set category 310, the generative-discriminative image-classification system 206 applies a fallback sequence 312. For example, the fallback sequence 312 involves storing the input image 302 (e.g., for subsequent analysis, use in training iterations, etc.). Where impractical to store the input image 302 or to conserve storage space, the generative-discriminative image-classification system 206 in at least one implementation stores data about the input image 302 rather than saving the input image 302 itself. Examples of data stored about the input image 302 may include image metadata, image statistics, image properties, etc.

Additionally or alternatively, the fallback sequence 312 involves returning an error message (e.g., via a graphical user interface of a client device) indicating that the generative-discriminative image-classification system 206 does not recognize the input image 302. Still further the fallback sequence 312 optionally involves the generative-discriminative image-classification system 206 requesting, via a graphical user interface, user input to provide a ground truth classification for the input image. In some embodiments, the user input indicating the ground truth classification corresponds to a known classification, and in other embodiments, the user input corresponds to a new classification (i.e., not one of the classifications used to learn the augmented deep feature space). In one or more embodiments, the generative-discriminative image-classification system 206 updates one or more parameters of the classification model 306 based on the provided classification to improve future classification of input images (e.g., add the provided classification as a known classification).

Figure 4:
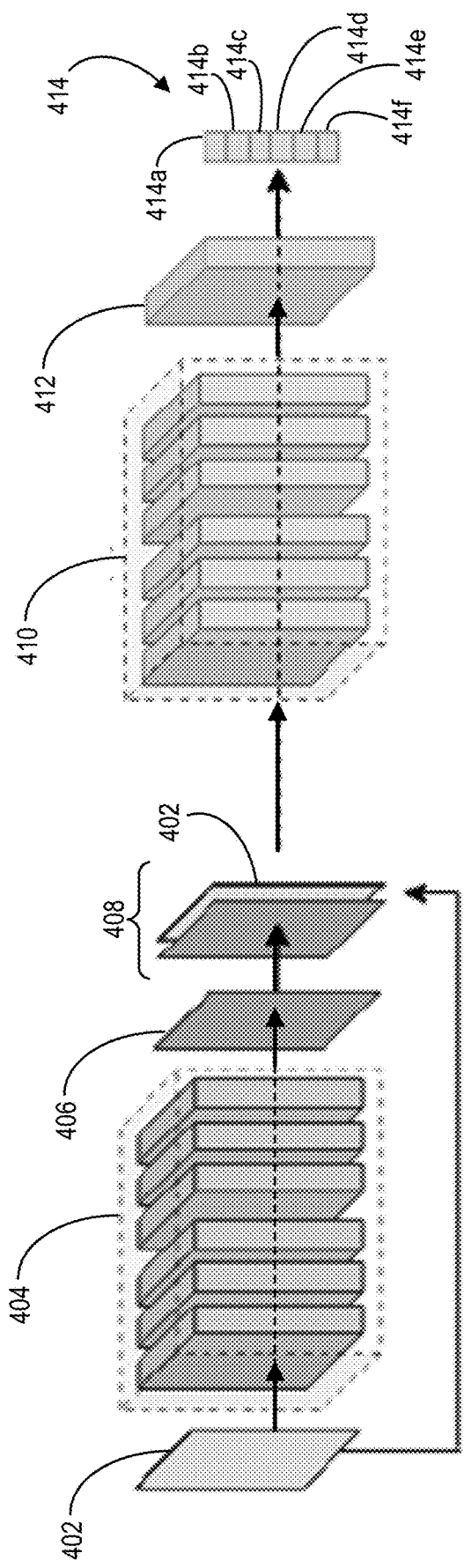
FIG. 4 illustrates an example generative-discriminative image-classification system generating classification scores for an input image in accordance with one or more embodiments.

As just described, in one or more embodiments, the generative-discriminative image-classification system 206 accurately classifies input images utilizing a combination of a generative model and a classification model. FIG. 4 illustrates an example of the generative-discriminative image-classification system 206 utilizing a generative model 404 and a classification model 410 to generate classification scores 414 for an input image 402 in accordance with one or more embodiments. The embodiment illustrated in FIG. 4 includes a generative neural network 404 as the generative model 404 and a classification neural network as the classification model 410. In one or more embodiments, the generative neural network 404 comprises an autoencoder neural network that includes an encoder network and a decoder network. Specifically, the encoder network comprises ten 3×3 convolutional layers, which each layer is followed by a batch normalization and leaky ReLu(0.2) operation. The decoder network has a similar structure to that of the encoder network and comprises transpose-convolution layers instead.

As shown in FIG. 4, the generative-discriminative image-classification system 206 receives or identifies the input image 402 (e.g., as a digital request from a client device) to classify. In response to receiving the input image 402, the generative-discriminative image-classification system 206 utilizes the generative neural network 404 to generate a reconstructed image 406. In some embodiments, generating the reconstructed image 406 involves the generative neural network 404 generating an image representation of the input image 402 (e.g., an encoding or vector embedding in a latent or deep feature space). For example, the generative neural network 404 utilizes an encoder or encoding algorithm to extract latent features from the input image 402. Specifically, with such an encoding algorithm, the generative neural network 404 extracts to a greater extent features that enable generation of a reconstructed image from a known classification while preserving to a lesser extent other features less informative for generation of a reconstructed image from a known classification. Accordingly, in some embodiments, the generative model 404 utilizes an encoding algorithm to weight, omit, add to, or otherwise selectively extract one or more features from the input image 402. This helps ensure that the generative neural network 404 reconstructs images from known classification better than images from unknown classifications or open-set images.

For example, in some embodiments, the generative neural network 404 represents, in the encoding of the input image 402, a specific subset of features from the input image 402 while omitting representation of other features from the input image 402. To illustrate, the generative-discriminative image-classification system 206 causes the generative neural network 404 to identify first and second sets of features. Then, the generative neural network 404 encodes the first set of features but disregards, or lightly weights, the second set of features. By only encoding or more heavily weighting the first set of features from the input image 402 (e.g., closed-set features), the generative-discriminative image-classification system 206 reconstructs images from known classification more accurately than open-set images.

Additionally or alternatively, in some embodiments, the generative neural network 404 generates an encoding of the input image 402 by performing a combination of weighted feature representation and selective (e.g., exclusionary) feature representation. For example, the generative model 404 weights, in the encoding of the input image 402, portions of the first and/or second sets of features described above. Additionally for instance, the generative neural network 404 selectively represents, in the encoding of the input image 402, other portions of the first and/or second sets of features described above. In this manner, the generative-discriminative image-classification system 206 can flexibly and intelligently represent features from the input image 402.

After generating an encoding of the input image 402, the generative neural network 404 decodes the encoding to generate the reconstructed image 406. In other words, the generative neural network 404 generates a reproduced version of the input image 402 from the encoding. For example, utilizing a decoding algorithm, the generative neural network 404 transforms the encoded features of the encoding to a pictorial representation or reconstructed image 406.

The generative-discriminative image-classification system 206 then combines the reconstructed image 406 with the input image 402 to form an input combination 408. For example, in some embodiments, the generative-discriminative image-classification system 206 concatenates the input image 402 and the reconstructed image 406. In concatenating the input image 402 and the reconstructed image 406, the generative-discriminative image-classification system 206 generates a 2n-channel input (e.g., a 6-channel input), where the input image 402 comprises n-channels (e.g., 3 channels) and the reconstructed image 406 comprises n-channels (e.g., 3-channels). For instance, generating the input combination 408 comprises (i) converting the input image 402 into a first three-channel red-green-blue ("RGB") input, (ii) converting the reconstructed image 406 into a second three-channel RGB input, and (iii) concatenating the first three-channel RGB input and the second three-channel RGB input to generate a six-channel input for the classification model 410. Additionally or alternatively, the generative-discriminative image-classification system 206 combines the input image 402 and the reconstructed image 406 in another manner, (e.g., utilizing one or more acts or algorithms involving max pooling, average pooling, min-pooling, etc.).

Subsequently, the generative-discriminative image-classification system 206 utilizes the classification neural network 410 to generate classification scores 414 from the input combination 408. For instance, the classification neural network encodes the input combination 408 into a deep feature space (optionally robustly learned according to the self-supervision techniques described below). After encoding the input combination 408 into the deep feature space, the classification neural network 410 applies various acts and algorithms to generate the classification scores 414 (shown in FIG. 4 as classification scores 414a-414f for each of the known classifications) based on the encoding of the input combination 408.

In one or more embodiments, the classification neural network 410 comprises 9 layers of 3×3 convolution filters followed by batch-normalization and leaky ReLu(0.2) operations, and ends with a fully-connected layer 412. For example, in one or more embodiments, the classification neural network 410 is similar to the classification model described in Lawrence Neal, Matthew Olson, Xiaoli Fern, Weng-Keen Wong, and Fuxin Li, *Open Set Learning with Counterfactual Images*, in ECCV, 2018, pp. 613-628, the contents of which are expressly incorporated herein by reference, albeit that the classification neural network 410 accepts a 6-channel input.

Based on the classification scores 414, the classification neural network 410 determines an image classification for the input image 402. For example, the classification neural network 410 determines if the highest classification score of the classification scores 414a-414f satisfies a predetermined threshold (e.g., a classification probability of 90%). If a classification score satisfies the predetermined threshold, the generative-discriminative image-classification system 206 assigns an associated image classification to the input image 402. Similarly, if multiple classification scores satisfy the predetermined threshold, the generative-discriminative image-classification system 206 assigns the input image 402 an image classification corresponding to the highest classification score that satisfies the predetermined threshold. On the other hand, if none of the classification scores 414a-414f satisfy the predetermined threshold, the generative-discriminative image-classification system 206 determines that the input image 402 corresponds to an open-set category distinct from the known classifications.

Figure 5:
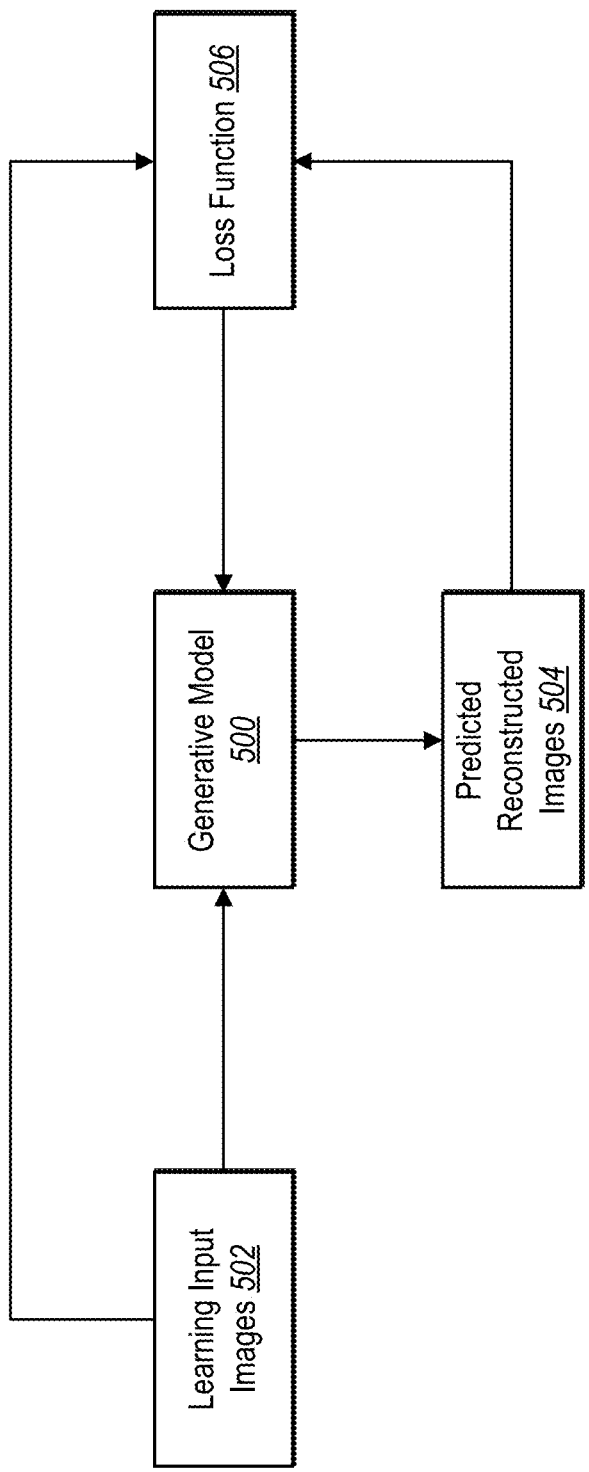
FIG. 5 illustrates an overview of a process of a generative-discriminative image-classification system training a generative model in accordance with one or more embodiments.

As mentioned above, the generative-discriminative image-classification system 206 in trains a generative model to encode digital images of known classes into an augmented deep feature space and then reconstruct the digital images. FIG. 5 illustrates the generative-discriminative image-classification system 206 training a generative model 500 in accordance with one or more embodiments. As shown in FIG. 5, the generative-discriminative image-classification system 206 processes learning input images 502 utilizing the generative model 500. As described above, the generative model 500 utilizes maps the learning input images 502 into an augmented deep feature space in the form of a feature encoding. The generative model 500 then generates the predicted reconstructed images 504 by decoding the feature encodings. In these or other embodiments, the learning input images 502 all depict objects corresponding to known classifications rather than open-set objects. Using a loss function 506, the generative-discriminative image-classification system 206 compares the predicted reconstructed images 504 with ground truth data (i.e., the learning input images 502) to determine a generative loss, such as a reconstruction error. For example, a generative loss includes one or more of a least square errors loss, a minimax loss, a Wasserstein loss, etc.

In more detail, the loss function 506 in some embodiments includes, but is not limited to, a regression loss function (e.g., a mean square error function, a quadratic loss function, an L2 loss function, a mean absolute error/L1 loss function, mean bias error). Based on this determined generative loss, the generative-discriminative image-classification system 206 adjusts various parameters/hyperparameters to improve the quality/accuracy of a predicted reconstructed image in subsequent training iterations—by narrowing the difference (e.g., decreasing a reconstruction error) between the predicted reconstructed image and the learning input image.

As discussed above, by training the generative model 500 using only, or substantially only, image of known classes rather than open-set images, the generative model 500 learns to more accurately represent (i.e., encode) and reproduce (i.e., decode) images of known classes compared to open-set images. In other words, since the generative model 500 has not seen open-set images, the generative model 500 will not be able to represent (i.e., encode) and reproduce (i.e., decode) open-set images as well as images on known classes. Thus, the generative-discriminative image-classification system 206 can ensure that the generative model 500 learns network weights/parameters that result in higher correspondence between input images and reconstructed images of known classes. Similarly, the generative-discriminative image-classification system 206 can ensure that the generative model 500 learns network weights/parameters that result in lower correspondence between input images and reconstructed images of open-set classes.

Figure 6:
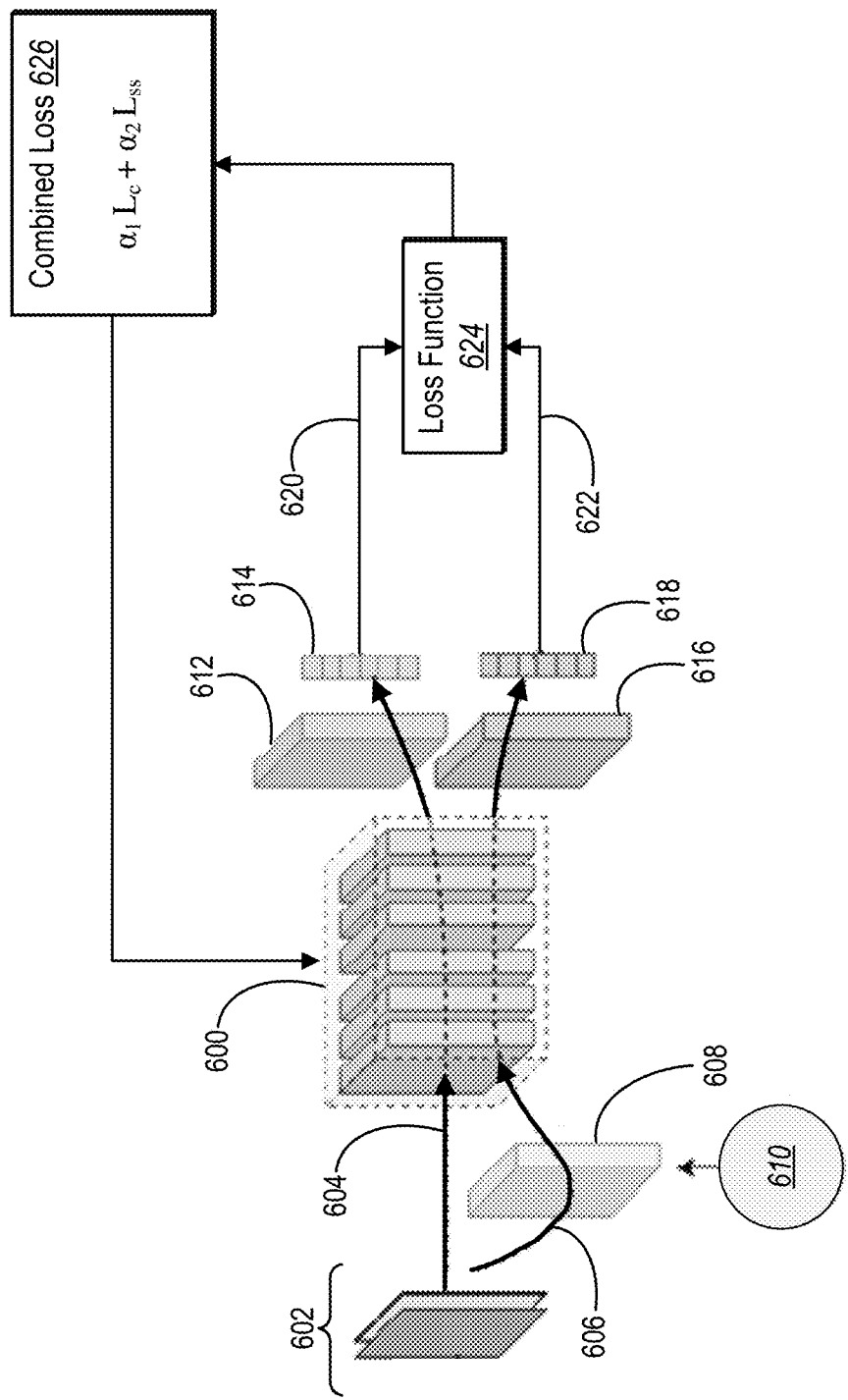
FIG. 6 illustrates an overview of a process of a generative-discriminative image-classification system training a classification model utilizing self-supervision in accordance with one or more embodiments.

As mentioned above, in one or more embodiments, the generative-discriminative image-classification system 206 utilizes self-supervised learning for the classification model to learn discriminative features and extend optional closed-set features to have the capacity to describe shapes, structure, and semantics. In so doing, the generative-discriminative image-classification system 206 can generate a more robust feature space of closed-set features and reduce classification scores for open-set features. FIG. 6 illustrates the generative-discriminative image-classification system 206 utilizing self-supervision to train a classification model 600 in accordance with one or more embodiments. As shown in FIG. 6, the generative-discriminative image-classification system 206 can process an input 602 along a classification path 604 and a self-supervision path 606. As shown in FIG. 6, in embodiments utilizing both generative conditioning and self-supervision, the input 602 can comprises an input combination of an input image concatenated with a reconstrued image generated by a generative model. In embodiments, utilizing self-supervision independent from generative conditioning, the input 602 can comprise the input image without a reconstructed image. Based on the classification path 604 and the self-supervision path 606, the generative-discriminative image-classification system 206 performs corresponding classifications/predictions and utilizes a loss functions 624 to update parameters of the classification model 600.

In more detail, the classification path 604 and the self-supervision path 606 are two separate, distinct paths through the classification model 600. For example, the generative-discriminative image-classification system 206 applies encodes the input 602 directly along classification path 604. In contrast for the self-supervision path 606, the generative-discriminative image-classification system 206 applies one or more acts or algorithms to the input 602 before utilizing the classification model 600 to encode the input. In particular, the generative-discriminative image-classification system 206 utilizes a transformation applicator 608 to randomly apply one or more transformation(s) 610 for a set of known transformations. In these or other embodiments, the one or more transformation(s) 610 includes a number and/or combination of rotations in various degrees, multi-axis mirror or flips, etc. For instance, the generative-discriminative image-classification system 206 applies, to the input 602, a ninety degree clock-wise rotation and an axial-mirroring about the horizontal axis (e.g., the zero degree or one-hundred-eighty degree line). Subsequently, the generative-discriminative image-classification system 206 utilizes the classification model 600 to encode the transformed input.

Along the classification path 604, the classification model 600 performs various acts utilizing algorithms (e.g., in accordance with a variety of neural network layers as described above in relation to FIG. 4). For example, the generative-discriminative image-classification system 206 causes the classification model 600 to generate classification probabilities 614 via a classification branch 612. Additionally, the generative-discriminative image-classification system 206 causes the classification model 600 to generate transformation probabilities 618 via a transformation classification branch 616. To illustrate, the classification model 600 predicts, for the classification path 604 at the classification branch 612, the classification probabilities 614 that indicate respective probabilities or classification scores that the input corresponds to each classification of a set of known classifications. Similarly, the classification model 600 predicts, for the self-supervision path 606 at the transformation classification branch 616, the transformation probabilities 618 that indicate respective transformation probabilities or transformation scores that correspond to each transformation of a set of known transformations (e.g., a +/−45-degree rotation, +/−90-degree rotation, vertical-axis flip, horizontal-axis flip, etc.).

Based on the classification probabilities 614 and the transformation probabilities 618, the classification model 600 generates a classification prediction 620 and a transformation prediction 622, respectively. For example, the classification model 600 generates the classification prediction 620 based on a corresponding classification probability of the classification probabilities 614 being the highest classification probability. Likewise, for example, the classification model 600 generates the transformation prediction 622 based on one or more corresponding transformation probabilities of the transformation probabilities 618 being the highest transformation probability.

In turn, the generative-discriminative image-classification system 206 in determines a self-supervision loss and a classification loss utilizing the loss functions 624. For example, in a same or similar manner as described above in relation to the loss function 506 of FIG. 5, the generative-discriminative image-classification system 206 compares the classification prediction 620 with a ground truth classification for the input 602 to determine a classification loss (e.g., a cross-entropy loss). In addition, the generative-discriminative image-classification system 206 compares the transformation prediction 622 with ground truth data (e.g., the one or more transformation(s) 610 actually applied to the input 602). In so doing, the image classification system determines a self-supervision loss (e.g., a cross-entropy loss).

Based on the classification loss and the self-supervision loss, the generative-discriminative image-classification system 206 updates one or more parameters of the classification model 600. For example, the generative-discriminative image-classification system 206 generates a combined loss 626 that combines the self-supervision loss and the classification loss (e.g., as a composite loss $L_c+L_{ss}$). In some embodiments, the generative-discriminative image-classification system 206 weights the components of the combined loss 626 (e.g., as denoted in FIG. 6 with the weight $\alpha_1$ corresponding to the classification loss $L_c$, and the weight $\alpha_2$ corresponding the self-supervision loss $L_{ss}$). For instance, in some implementations, the generative-discriminative image-classification system 206 weights the classification loss more heavily than the self-supervision loss (e.g., $\alpha_1=0.8$ and $\alpha_2=0.2$). However, in other implementations, the generative-discriminative image-classification system 206 utilizes a different weighting and/or weight the self-supervision loss equally or greater than the classification loss. Based on the combined loss 626, the generative-discriminative image-classification system 206 adjusts various parameters/hyperparameters to improve the quality/accuracy of a classification/transformation prediction in subsequent training iterations—by narrowing the difference (e.g., increasing a classification/transformation probability) between respective ground truth data and the classification prediction 620 and the transformation prediction 622.

In one or more embodiments, the generative-discriminative image-classification system 206 trains the generative model G and the classification model C in accordance with the following training algorithm:

Classification Step.

$$\hat{x} \leftarrow G(x)$$

$$z=[x,\hat{x}];$$

$$l_c=\text{CrossEntropy}(C(z),y)$$

Self-supervision Step.
Pick transformation randomly.

$$r=\text{rand}(\Omega(T))$$

$$t=T[r];$$

$$z=[t(x),t(\hat{x})];$$

$$l_{ss}=\text{CrossEntropy}(C(z),r)$$

$$l_t=\alpha_1 l_c+\alpha_2 l_{ss}$$

Backpropagate to change and C.

In particular, x represents a training image, y represents a ground truth classification label for the training image x. T represents the transformation set for self-supervised learning, while r represented a selected transformation from the transformation set T. Furthermore, $\alpha_1$ and $\alpha_2$ represent weights for balancing learning between the classification loss $L_c$ and the self-supervision loss $L_{ss}$. In one or more embodiments, the generative-discriminative image-classification system 206 trains the generative model G and the classification model C using 1000 iterations using a batch size of 64, learning rate of 0.001 and parameters (0.5, 0.999). First, the generative-discriminative image-classification system 206 trains the generative model G using training images from known classifications. Then, as illustrated by the training algorithm, the generative-discriminative image-classification system 206 generates an input combination z by augmenting a training image x with a corresponding reconstructed image $\hat{x}$. The generative-discriminative image-classification system 206 then utilizes the classification model 600 along the classification path 604 to generate a classification for the training image x based on the input combination z and obtain a classification loss $L_c$. Then the generative-discriminative image-classification system 206 randomly selects and applies a transformation r from the transformation set T to the input combination z. The generative-discriminative image-classification system 206 then utilizes the self-supervision path 606 to predict the applied transformation and determine a self-supervision loss $L_{ss}$. The generative-discriminative image-classification system 206 then determines a composite or combined loss $L_t$. The generative-discriminative image-classification system 206 then backpropagates the composite loss $L_t$ to find gradients associated with each network weight of the classification model 600. The generative-discriminative image-classification system 206 then updates the network weights of the classification model 600 according to the Adam optimizer or another network updating algorithm.

The use of self-supervised learning, as described above in relation to FIG. 6, helps the classification model 600 to take into consideration more factors than just class separation. In particular, the use of self-supervision makes the deep feature space into which the classification model 600 encodes digital images (or input combinations) more robust and richer. In particular, by learning features that encode semantics/shape structures of images of known classes, during inference the classification model 600 will encode open-set images with different semantics/shape structures outside of positive half-spaces associated with known classifications.

Figure 7:
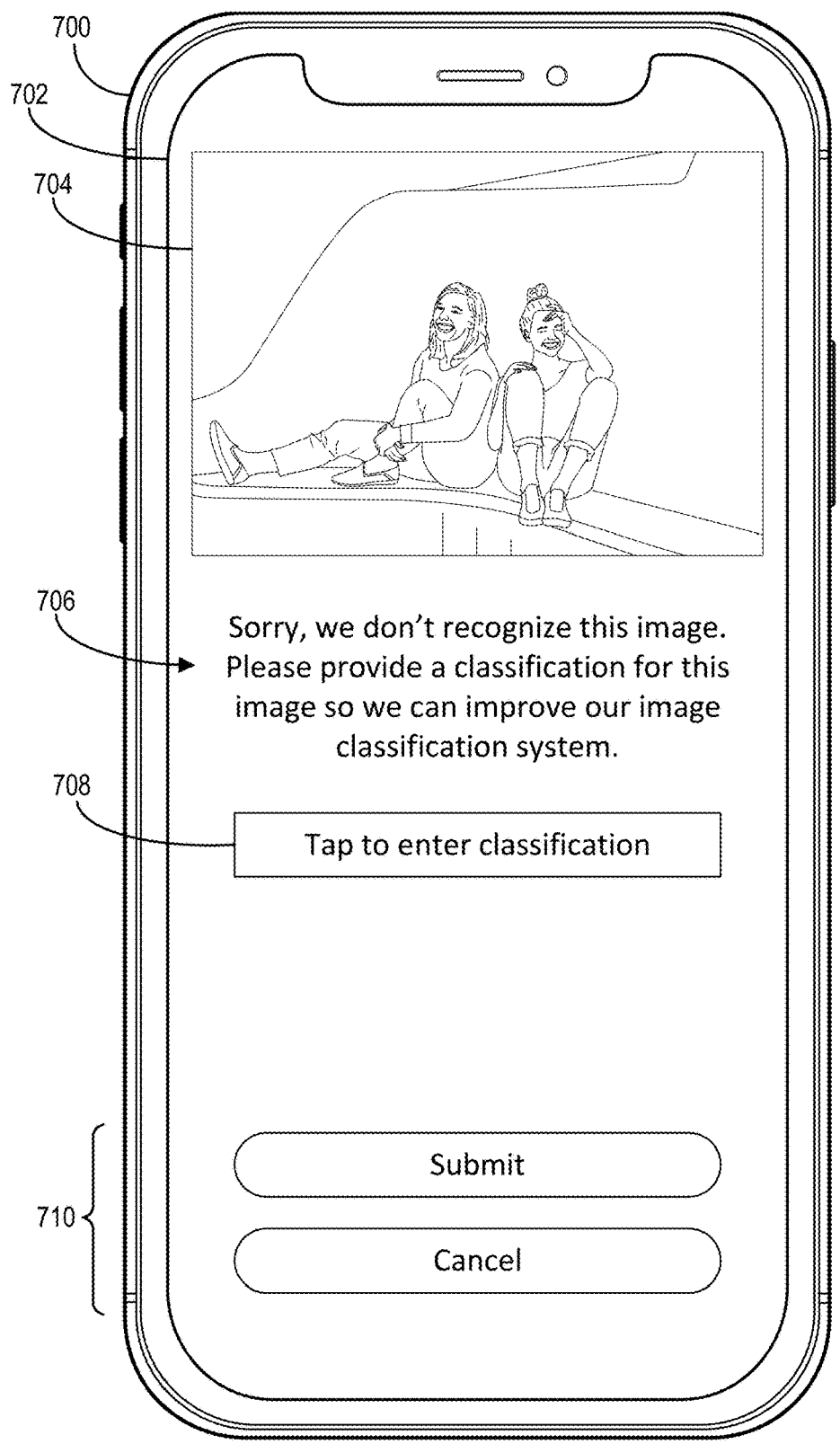
FIG. 7 illustrates a user interface for receiving input for an object identified as an open-set object in accordance with one or more embodiments.

As mentioned above, in one or more embodiments, the generative-discriminative image-classification system 206 applies a fallback sequence in response to determining that an input image corresponds to an open-set category. FIG. 7 illustrates the generative-discriminative image-classification system 206 providing a user interface 702 on a computing device 700 as part of a fallback sequence in accordance with one or more embodiments. For example, in response to user input requesting classification of an input image 704, the generative-discriminative image-classification system 206 performs acts and algorithms discussed in relation to the foregoing figures to generate a reconstructed image based on the input image 704 utilizing a generative model. Then, based on a classification model processing an input combination comprising the input image 704 and the reconstructed image, the generative-discriminative image-classification system 206 determines that the input image 704 corresponds to an open-set category.

As shown in FIG. 7, in one or more embodiments, the generative-discriminative image-classification system 206, in response to determining that the input image 704 corresponds to an open-set category, returns a notification 706 indicating that the generative-discriminative image-classification system 206 has identified the input image 704 as an open-set image. Additionally or alternatively, the notification 706 includes a request to provide a ground truth classification for the input image 704. For example, the user interface 702 includes an input field 708 configured to receive user input of a ground truth classification for the input image 704. To illustrate, the generative-discriminative image-classification system 206 updates the user interface 702 in response to user input (e.g., a tap, long-press, etc.) at the digital field 708. For instance, in some implementations, the generative-discriminative image-classification system 206 updates the user interface 702 to include a digital keyboard for providing alphanumeric inputs as a ground truth classification for the input image 704.

Subsequent to providing the ground truth classification, the generative-discriminative image-classification system 206 can, in response to additional user input via selectable options 710, either submit the ground truth classification or else cancel/skip the fallback sequence. For example, in response to receiving the ground truth classification, the generative-discriminative image-classification system 206 updates one or more parameters of a classification model and stores the input image 704 for subsequent gathering of additional images corresponding to the provided ground truth classification, etc. In this manner, the generative-discriminative image-classification system 206 can further improve classification accuracy by adding additional classifications.

As discussed above, the generative-discriminative image-classification system 206 in some embodiments more accurately classifies images by better distinguishing images that correspond to an open-set category. FIG. 8A illustrates experimental results of classification score histograms 802-804 as determined in accordance with a conventional classification system (the classification model described in Open Set Learning with Counterfactual Images, which was previously incorporated by reference). As shown in FIG. 8A, there is significant overlap between the classification score histogram 802 associated with open-set images and the classification score histogram 804 associated with closed-set (i.e., known) images. Due to such overlap in classification scores, conventional systems can reflect decreased classification accuracy, among other technical issues as described above.

Figure 8B:
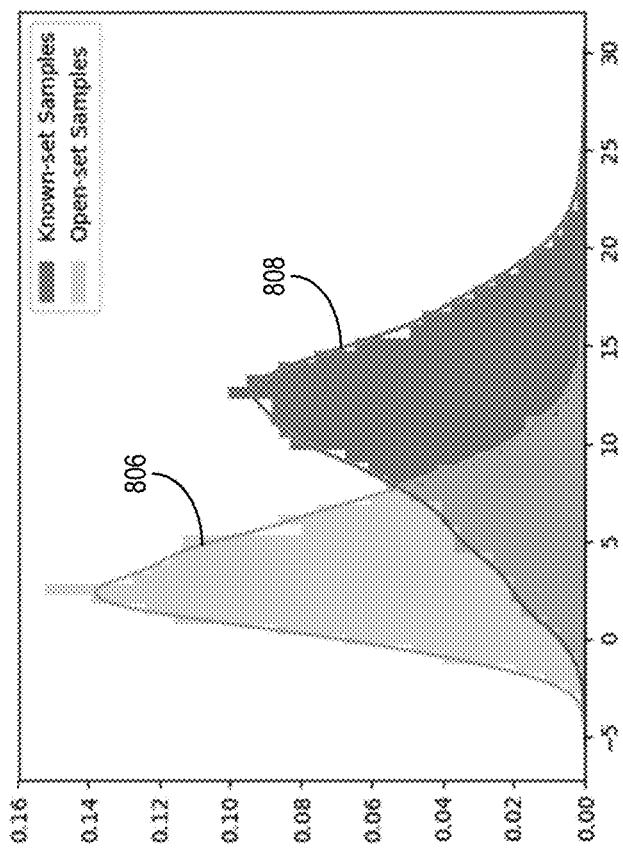
FIG. 8B illustrates score histograms for open-set and known-set samples generated from experimental results of the generative-discriminative image-classification system in accordance with one or more embodiments.
Figure 8A:
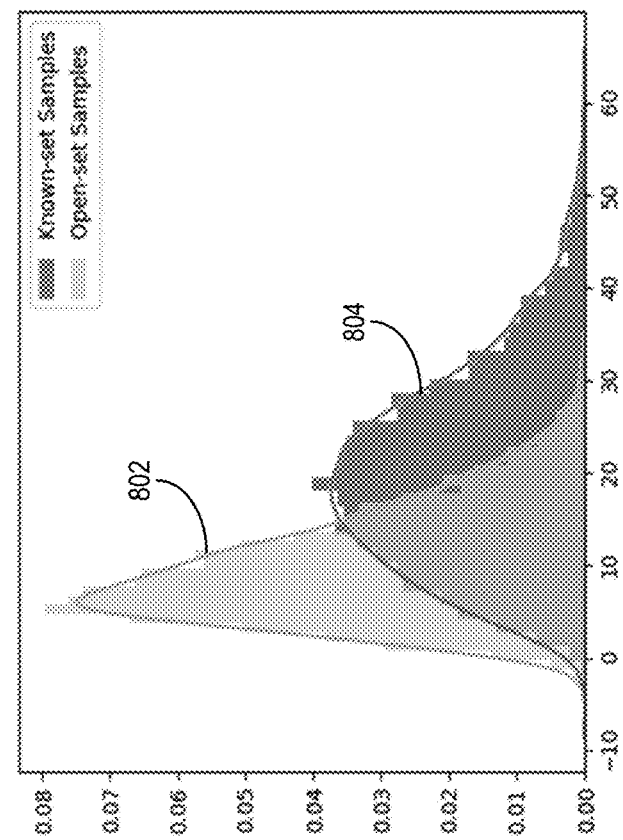
FIG. 8A illustrates score histograms for open-set and known-set samples generated from experimental results of a conventional classification system.

In contrast, FIG. 8B illustrates experimental results of the generative-discriminative image-classification system 206 generating classification scores in accordance with one or more embodiments of the present disclosure. As shown in FIG. 8B, the generative-discriminative image-classification system 206 can, for the same set of open-set images and closed-set images scored by a conventional system in FIG. 8A, generate classification score histograms 806-808. As evident from the classification score histograms 806-808, the generative-discriminative image-classification system 206 in one or more embodiments imparts improved score separation between the open-set images and the closed-set images. This improved score separation can lead to better classification accuracy as described above.

Figure 9B:
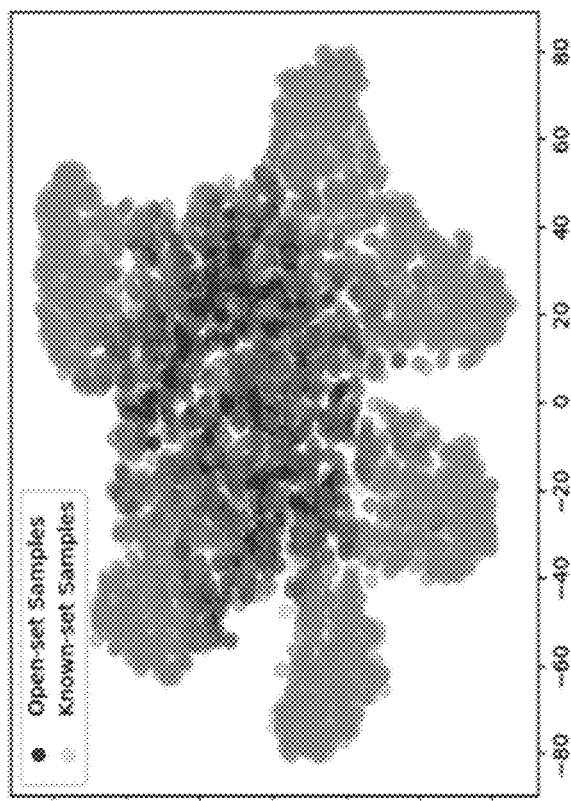
FIG. 9B illustrates a visualization of a feature space of a generative-discriminative image-classification system in accordance with one or more embodiments.
Figure 9A:
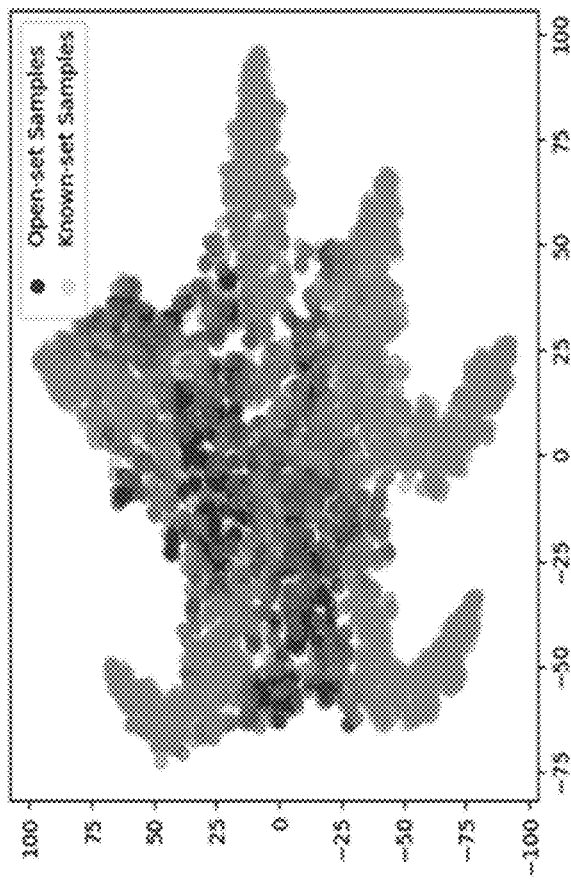
FIG. 9A illustrates a visualization of a feature space of a conventional classification system.

In addition to the foregoing experimental results, FIG. 9A indicates a t-distributed stochastic neighbor embedding (tSNE) visualization of a feature space generated in accordance with the conventional classification system used to generate the results of FIG. 8A for both known images and open-set images of a test dataset. As shown in FIG. 9A, the conventional classification system generates significant overlap of open-set images and closed-set (i.e., known) images in the feature space. This overlap, as discussed above, can lead conventional systems to misclassify open-set images as corresponding to a known classification.

In contrast, FIG. 9B illustrates the generative-discriminative image-classification system 206 providing experimental results in accordance with one or more embodiments of the present disclosure. As shown in FIG. 9B, the generative-discriminative image-classification system 206 in some embodiments generates, in comparison to conventional systems, an improved feature space on the same test dataset visualized in FIG. 9A. Specifically, a tSNE visualization of a feature space evidences that the generative-discriminative image-classification system 206 in some embodiments improves clustering of images corresponding to known classifications. For example, by more tightly clustering images of known classifications, the generative-discriminative image-classification system 206 reduces overlap between closed-set images and images corresponding to an open-set category. In reducing such overlap, the generative-discriminative image-classification system 206 can improve classification accuracy as described above.

To illustrate with further experimental results, Table 1 illustrated below indicates that the generative-discriminative image-classification system 206 in one or more embodiments provides an approximate average of eleven percent classification improvement over conventional systems with respect to the CIFAR test datasets. Similarly, Table 1 indicates an approximate average of five percent classification improvement over conventional systems with respect to the SVHN and TinyImageNet test datasets.

TABLE 1

Open-set detection performance in terms of AUC-ROC curve. "N/r" means not reported.

|  | CIFAR10 | CIFAR + 10 | CIFAR + 50 | SVHN | TinyImageNet |
|---|---|---|---|---|---|
| SoftMax | 67.7 ± 3.8 | 81.6 ± n/r | 80.5 ± n/r | 88.6 ± 1.4 | 57.7 ± n/r |
| OpenMax (CVPR16) | 69.5 ± 4.4 | 81.7 ± n/r | 76.9 ± n/r | 89.4 ± 1.3 | 57.6 ± n/r |
| G-OpenMax (BMVC17) | 67.5 + 4.4 | 82.7 ± n/r | 81.9 ± n/r | 89.6 ± 1.7 | 58.0 ± n/r |
| OSRCI (EECV 18) | 69.9 ± 3.8 | 83.8 ± n/r | 82.7 ± n/r | 91.0 ± 1.0 | 58.6 + n/r |
| C2AE (CVPR19) | 71.1 ± 0.8 | 81.0 ± 0.5 | 80.3 ± 0.0 | 89.2 ± 1.3 | 58.1 ± 1.9 |
| CROSR (CVPR19) | n/r | n/r | n/r | 89.9 ± 1.8 | 58.9 ± n/r |
| Generative-discriminative image-classification system 206 w/ Plain CNN | 80.7 ± 3.9 | 92.8 ± 0.2 | 92.6 ± 0.0 | 93.5 ± 1.8 | 60.8 ± 1.7 |
| Generative-discriminative image-classification system 206 w/WRN-28-10) | 83.1 ± 3.9 | 91.5 ± 0.2 | 91.3 ± 0.2 | 95.5 ± 1.8 | 64.7 ± 1.2 |

In addition, further experimental results shown in Table 2 below indicates that the generative-discriminative image-classification system 206 provides improved classification performance over conventional systems in scenarios involving out-of-distribution open-set detection (e.g., where the open-set images following a different distribution than the closed-set images). In particular, Table 2 illustrates that the generative-discriminative image-classification system 206, trained as described above in relation to FIGS. 5-6, in some embodiments provides classification improvement over conventional systems with respect to the corresponding test datasets for out-of-distribution image samples in ImageNet-Crop, ImageNet-Resize, LSUN-Crop, and LSUN-Resize.

TABLE 2

Performance of out-of-distributional object detection measured using macro-F1 score.

| Training Method | Detector | ImageNet-Crop | ImageNet-Resize | LSUN-Crop | LSUN-Resize |
|---|---|---|---|---|---|
| Cross-Entropy | SoftMax | 63.9 | 65.3 | 64.2 | 64.7 |
|  | OpenMax | 66.0 | 68.4 | 65.7 | 66.8 |
| Counterfactual | SoftMax | 63.6 | 63.5 | 65.0 | 64.8 |
| LadderNet | SoftMax | 64.0 | 64.6 | 64.4 | 64.7 |
|  | OpenMax | 65.3 | 67.0 | 65.2 | 65.9 |
|  | CROSR | 62.1 | 63.1 | 62.9 | 63.0 |
| DHRNet | SoftMax | 64.5 | 64.9 | 65.0 | 64.9 |
|  | OpenMax | 65.5 | 67.5 | 65.6 | 66.4 |
|  | CROSR | 72.1 | 73.5 | 72.0 | 74.9 |
| Generative-image-classification system 206 discriminative | Activations | 75.7 | 79.2 | 75.1 | 80.5 |
|  | SoftMax | 82.1 | 77.7 | 84.3 | 78.4 |

The foregoing results show the increased accuracy of embodiments that employ both the generative model and self-supervised learning. As mentioned above, conditioning the classification model based on a generative model can independently provide increased classification accuracy. Similarly, using self-supervised learning to train the classification model can independently provide increased classification accuracy. Table 3 shows closed-set classification accuracy along with open-set rejection performance of the conventional classification system used to generate the results of FIGS. 8A and 9A (i.e., Baseline) compared to an implementation of the generative-discriminative image-classification system 206 that includes only self-supervision and not generative augmentation, an implementation of the generative-discriminative image-classification system 206 that includes generative augmentation and not self-supervision, and an implementation of the generative-discriminative image-classification system 206 that uses both self-supervision and generative augmentation. The SS and GA implementations each increased open-set performance by approximately 4%. Furthermore, the implementation with combined SS and GA further improves performance by an additional 2.4% and 2.8%, respectively.

TABLE 3

Ablation Study showing classification performance (accuracy) and open-set rejection performance (AUC).

|  | Classification Accuracy | Open-set Rejections (AUC) |
|---|---|---|
| Baseline | 89.7 | 84.4 |
| Self-Supervision (SS) | 92.4 | 88.8 |
| Generative Augmentation (GA) | 91.5 | 88.4 |
| Combined SS and GA | 92.6 | 91.2 |

Figure 10:
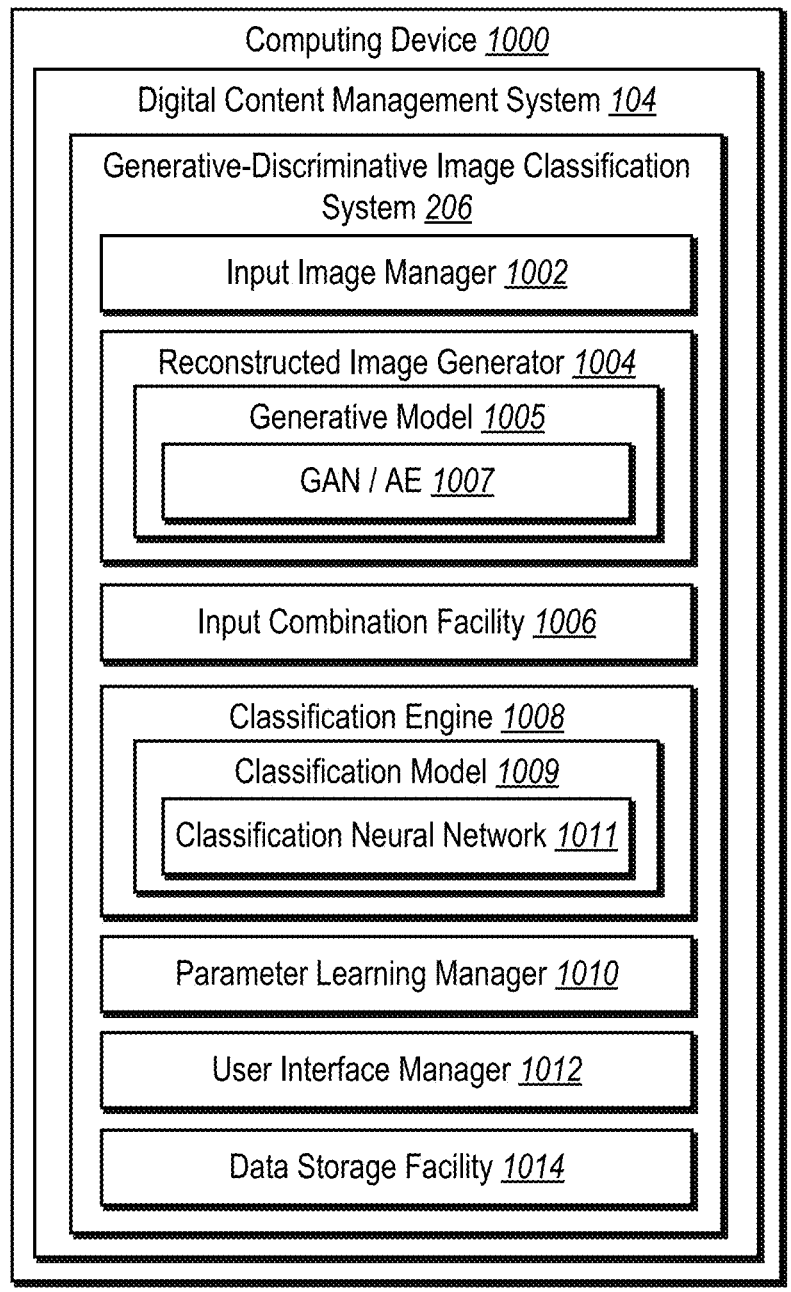
FIG. 10 illustrates an example schematic diagram of a generative-discriminative image-classification system in accordance with one or more embodiments.

Turning to FIG. 10, additional detail will now be provided regarding various components and capabilities of the generative-discriminative image-classification system 206. In particular, FIG. 10 illustrates an example schematic diagram of a computing device 1000 (e.g., the server(s) 102, the client device 208) implementing the generative-discriminative image-classification system 206 in accordance with one or more embodiments of the present disclosure. As shown, the generative-discriminative image-classification system 206 is further implemented by the server(s) 102 and the digital content management system 204. Also illustrated, the generative-discriminative image-classification system 206 includes an input image manager 1002, a reconstructed image generator 1004, an input combination facility 1006, a classification engine 1008, a parameter learning manager 1010, a user interface manager 1012, and a data storage facility 1014.

The input image manager 1002 in some embodiments receives, stores, transmits and/or analyzes an input image (as described in relation to the foregoing figures). For example, the input image manager 1002 receives classification requests to classify an input image. Additionally, in some implementations, the input image manager 1002 provides an input image to the reconstructed image generator 1004 for generating a reconstructed image, and to the input combination facility 1006 for generating an input combination.

The reconstructed image generator 1004 in some embodiments intelligently generates a reconstructed image (as described in relation to the foregoing figures). As shown the reconstructed image generator 1004 can include a generative model 1005 comprising a generative adversarial neural network (GAN), an autoencoder (AE), or another generative model 1007.

The input combination facility 1006 in some embodiments sends, receives, manipulates, or otherwise combines images (as described in relation to the foregoing figures). For example, the input combination facility 1006 combines an input image from the input image manager 1002 and a reconstructed image from the reconstructed image generator 1004. For example, the input combination facility 1006 concatenates the input image comprising n-channels and the reconstructed image comprising n-channels to generate an input combination as a 2n-channel input for applying to the classification engine 1008.

The classification engine 1008 in some embodiments intelligently classifies an input image (as described in relation to the foregoing figures). For example, the classification engine 1008 processes an input combination from the input combination facility 1006 by encoding the input combination into a feature space. Based on the encoding of the input combination, the classification engine 1008 determines classification probabilities. If a highest classification probability satisfies a predetermined threshold, the classification engine 1008 designates a classification corresponding to the classification score as the classification for the input image. As shown by FIG. 10, the classification engine 1008 can include a classification model 1009 comprising a classification neural network 1011 as described above.

The parameter learning manager 1010 in some embodiments trains one or more components of the generative-discriminative image-classification system 206 (as described in relation to the foregoing figures). For example, the parameter learning manager 1010 trains the reconstructed image generator 1004 as described above. In addition, the parameter learning manager 1010 trains the classification engine 1008 utilizing random transformations to apply self-supervision techniques. Further, the parameter learning manager 1010 trains the classification engine 1008 to determine a classification for an input image. In these or other embodiments, the parameter learning manager 1010 applies a generative loss for updating parameters of the reconstructed image generator 1004. Similarly, the parameter learning manager 1010 applies a combined loss comprising a classification loss and a self-supervision loss for updating parameters of the classification engine 1008.

The user interface manager 1012 in some embodiments provides, manages, and/or controls a graphical user interface (or simply "user interface"). For example, the user interface manager 1012 generates and displays a user interface by way of a display screen composed of a plurality of graphical components, objects, and/or elements that allow a user to perform a function. For example, the user interface manager 1012 receives user inputs from a user (e.g., in relation to an image classification request). Additionally, the user interface manager 1012 presents a variety of types of information, including text, digital media items, image classifications, etc.

The data storage facility 1014 maintains data for the generative-discriminative image-classification system 206. For example, the data storage facility 1014 (e.g., via one or more memory devices) maintains data of any type, size, or kind, as necessary to perform the functions of the generative-discriminative image-classification system 206. In these or other embodiments, the data storage facility 1014 includes a generative neural network and a classification neural network, in addition to elements such as digital images parameters, ground truth data, fallback sequence responses, etc.

Each of the components of the computing device 1000 can include software, hardware, or both. For example, the components of the computing device 1000 can include one or more instructions stored on a computer-readable storage medium and executable by processors of one or more computing devices, such as a client device or server device. When executed by the one or more processors, the computer-executable instructions of the generative-discriminative image-classification system 206 can cause the computing device(s) (e.g., the computing device 1000) to perform the methods described herein. Alternatively, the components of the computing device 1000 can include hardware, such as a special-purpose processing device to perform a certain function or group of functions. Alternatively, the components of the computing device 1000 can include a combination of computer-executable instructions and hardware.

Furthermore, the components of the computing device 1000 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1000 may be implemented as a stand-alone application, such as a desktop or mobile application. Furthermore, the components of the computing device 1000 may be implemented as one or more web-based applications hosted on a remote server.

The components of the computing device 1000 may also be implemented in a suite of mobile device applications or "apps." To illustrate, the components of the computing device 1000 may be implemented in an application, including but not limited to ADOBE® DOCUMENT CLOUD, ADOBE® ADVERTISING CLOUD, ADOBE® PHOTOSHOP, ADOBE® CREATIVE CLOUD, ADOBE® SENSEI. Product names, including "ADOBE" and any other portion of one or more of the foregoing product names, may include registered trademarks or trademarks of Adobe Inc. in the United States and/or other countries.

Figure 11:
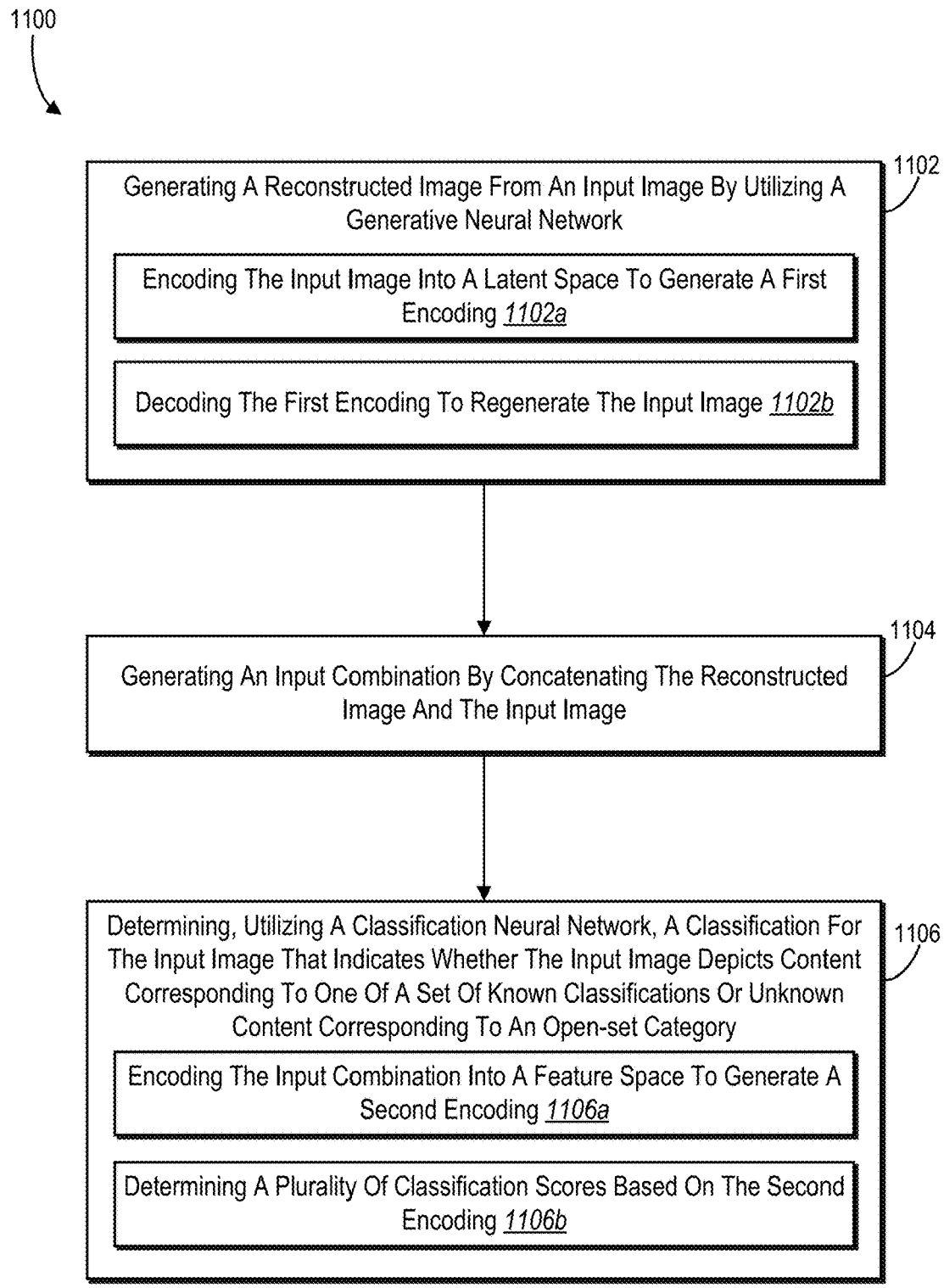
FIG. 11 illustrates a flowchart of a series of acts for determining a classification for an input image in accordance with one or more embodiments.

FIGS. 1-10, the corresponding text, and the examples provide several different systems, methods, techniques, components, and/or devices of the generative-discriminative image-classification system 206 in accordance with one or more embodiments. In addition to the above description, one or more embodiments can also be described in terms of flowcharts including acts for accomplishing a particular result. For example, FIG. 11 illustrates a flowchart of a series of acts 1100 for determining a classification for an input image in accordance with one or more embodiments. The generative-discriminative image-classification system 206 may perform one or more acts of the series of acts 1100 in addition to or alternatively to one or more acts described in conjunction with other figures. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown, the series of acts 1100 includes an act 1102 of generating a reconstructed image from an input image by utilizing the generative neural network. As shown in FIG. 11, the act 1102 comprises act 1102*a* of encoding the input image into a latent space to generate a first encoding. For example, act 1102*a* includes encoding features from the input image in a vector embedding. In addition, the act 1102 comprises act 1102*b* of decoding the first encoding to regenerate the input image. For example, act 1102*b* includes decoding a vector embedding to pictorially represent the features from the vector embedding in the reconstructed image.

The series of acts 1100 further includes an act 1104 of generating an input combination by concatenating the reconstructed image and the input image. In some embodiments, generating the input combination comprises generating a 2n-channel input by concatenating the input image in n-channel form and the reconstructed image in n-channel form. For example, generating the input combination comprises converting the input image into a first three-channel Red-Green-Blue (RGB) input; converting the reconstructed image into a second three-channel RGB input; and concatenating the first three-channel RGB input and the second three-channel RGB input to generate a six-channel input for the classification model.

The series of acts 1100 further includes an act 1106 of determining a classification for the input image that indicates whether the input image depicts content corresponding to one of a set of known classifications or unknown content corresponding to an open-set category by utilizing a classification neural network. As shown in FIG. 11, the act 1106 comprises an act 1106*a* of encoding the input combination into a feature space to generate a second encoding. In addition, the act 1106 further comprises an act 1106*b* of determining a plurality of classification scores based on the second encoding. In these or other embodiments, the act(s) of 1106 include utilizing a classification model (e.g., the classification neural network) to determine whether the input image corresponds to a known classification or the open-set category based on a disparity between the reconstructed image and the input image.

In some embodiments, the act(s) of 1106 include determining a classification for the input image by: generating a classification score for the input image for each known classification of a set of known classifications; and determining a highest classification score associated with the known classification meets a predetermined threshold.

In some embodiments, the act(s) of 1106 include determining a classification for the input image by: generating a classification score for the input image for each known classification of a set of known classifications; determining that none of the classification scores meet a predetermined threshold; and determining, based on none of the classification scores meeting the predetermined threshold, that the classification for the input image corresponds to the open-set category. Accordingly, in some embodiments, the act(s) of 1106 include determining the classification for the input image corresponds to the open-set category based on each classification score of the plurality of classification scores failing to satisfy a predetermined threshold.

It is understood that the outlined acts in the series of acts 1100 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 11, act(s) in the series of acts 1100 include an act of learning parameters for the classification model by: generating a transformed input combination by applying one or more random transformations to the input combination; generating a transformation prediction by processing the transformed input combination utilizing the classification model; determining a self-supervision loss based on a comparison of the transformation prediction and the one or more random transformations applied to the input combination; and updating one or more parameters of the classification model based on the self-supervision loss.

As another example of an additional act not shown in FIG. 11, act(s) in the series of acts 1100 include an act of applying a fallback sequence in response to determining that a classification for the input image corresponds to the open-set category. For example, applying the fallback sequence includes performing at least one of: storing the input image and/or data regarding the input image; returning an error message; returning a message that the classification for the input image is unknown; or requesting, via a graphical user interface, user input to provide a ground truth classification for the input image; and updating parameters of the classification model utilizing the ground truth classification for the input image.

In yet another example of an additional act not shown in FIG. 11, act(s) in the series of acts 1100 include an act of learning parameters for the generative neural network by: determining a generative loss based on a comparison of the reconstructed image and the input image; and updating one or more parameters of the generative neural network based on the generative loss.

In addition, an example of another act not shown in FIG. 11, act(s) in the series of acts 1100 include an act of learning the parameters of the classification neural network by: determining a classification loss based on a comparison of the classification and a ground truth classification; and updating the one or more parameters of the classification neural network based on the classification loss. In some embodiments, learning the parameters of the classification neural network include applying a first weight to the self-supervision loss and a second weight to the classification loss; and updating the one or more parameters of the classification neural network based on a weighted combination of the self-supervision loss and the classification loss.

Further, as another example of an additional act not shown in FIG. 11, act(s) in the series of acts 1100 include an act of determining a classification for the input image by: comparing classification scores for each of the plurality of classification scores; determining a highest classification score of the plurality of classification scores satisfies a predetermined threshold; and identifying the classification corresponds to the highest classification score.

Additionally or alternative to the foregoing, in some embodiments, act(s) in the series of acts 1100 include an act of: encoding an input image into a latent space to generate a first encoding; generating a reconstructed image by decoding the first encoding to regenerate the input image; generate an input combination by concatenating the reconstructed image and the input image; and determining, by processing the input combination utilizing a classification model, whether the input image depicts content corresponding to a known classification or unknown content corresponding to an open-set category.

Additionally or alternative to the foregoing, in some embodiments, act(s) in the series of acts 1100 include an act of: encoding features from an input image in a vector embedding; generating, utilizing a generative neural network, a reconstructed image from an input image by decoding the vector embedding to pictorially represent the features in the reconstructed image; generating an input combination by combining the reconstructed image and the input image; determining a plurality of classification scores for the input image by analyzing encoded features of the input combination utilizing a classification neural network; and determining a classification for the input image based on the plurality of classification scores that indicates whether the input image depicts content corresponding to a known classification or unknown content corresponding to an open-set category.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
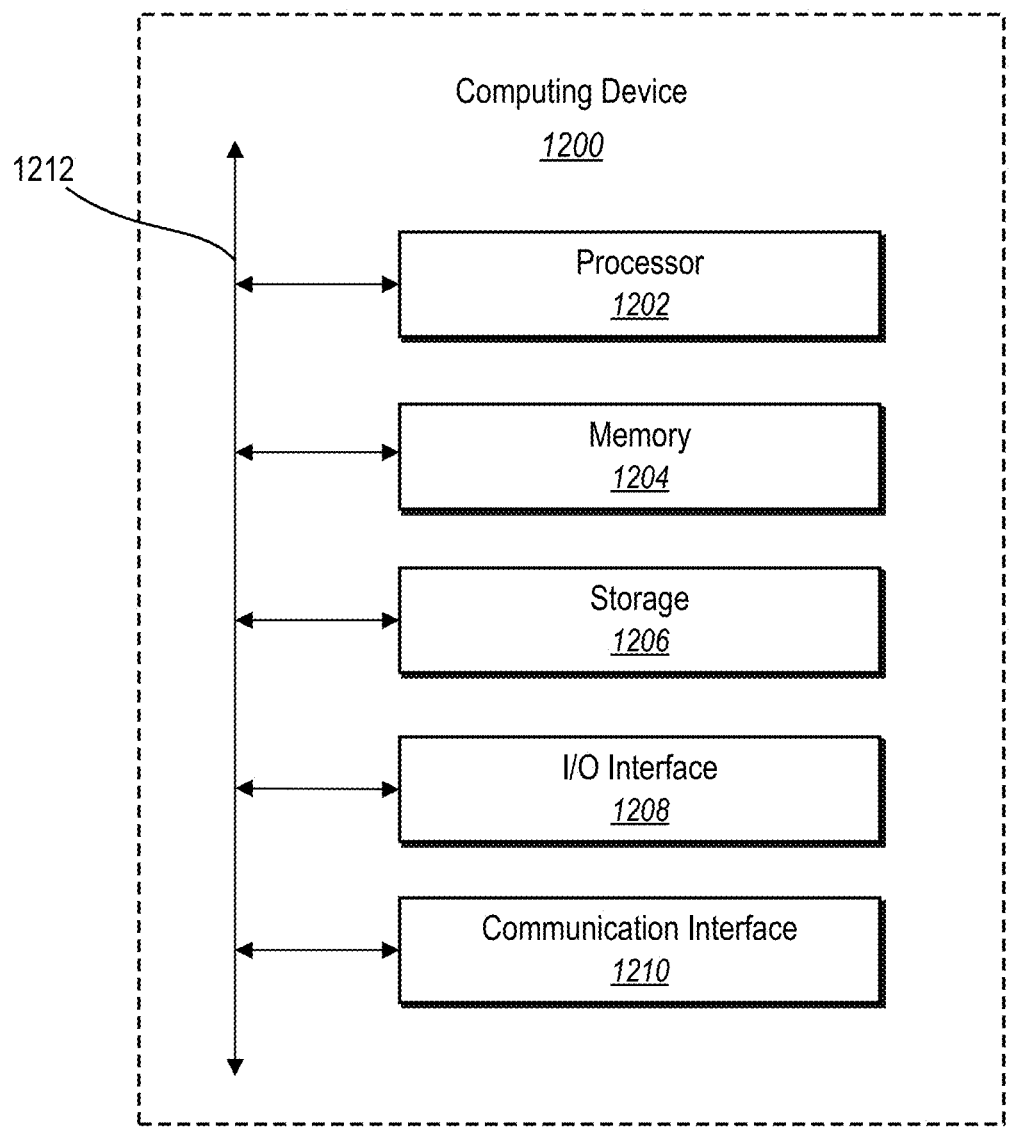
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the computing device 1000, the computing device 700, the server(s) 102, and/or the client device 208). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 includes one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 in some embodiments includes one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 includes a non-transitory storage medium described above. The storage device 1206 in some embodiments includes a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 in some embodiments include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 in some embodiments include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 further includes a communication interface 1210. The communication interface 1210 in some embodiments includes hardware, software, or both. The communication interface 1210 provides one or more interfaces for communication (such as, for example, packet-based communication) between the computing device and one or more other computing devices or one or more networks. As an example, and not by way of limitation, communication interface 1210 include a network interface controller (NIC) or network adapter for communicating with an Ethernet or other wire-based network or a wireless NIC (WNIC) or wireless adapter for communicating with a wireless network, such as a WI-FI. The computing device 1200 further includes a bus 1212. The bus 1212 in some embodiments includes hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing which, when executed by at least one processing device, cause the at least one processing device to perform operations comprising:
   encoding an input image into a latent space to generate a first encoding;
   generating a reconstructed image by decoding the first encoding to regenerate the input image;
   generating an input combination of the reconstructed image and the input image by concatenating the reconstructed image and the input image; and
   determining, by processing the input combination utilizing a classification model, whether the input image depicts content corresponding to a known classification or unknown content corresponding to an open-set category based on a disparity between the reconstructed image and the input image.

2. The non-transitory computer-readable medium of claim 1, wherein generating the input combination further comprises:
   converting the input image into a first three-channel Red-Green-Blue (RGB) input;
   converting the reconstructed image into a second three-channel RGB input; and
   concatenating the first three-channel RGB input and the second three-channel RGB input to generate a six-channel input for the classification model.

3. The non-transitory computer-readable medium of claim 1, wherein the operations further comprise utilizing the classification model to determine whether the input image corresponds to the known classification or the open-set category based on a disparity between the reconstructed image and the input image, wherein a greater disparity indicates the open-set category.

4. The non-transitory computer-readable medium of claim 1, wherein the operations further comprise determining a classification for the input image by:
   generating a classification score for the input image for each known classification of a set of known classifications; and
   determining a highest classification score associated with the known classification meets a predetermined threshold.

5. The non-transitory computer-readable medium of claim 1, wherein the operations further comprise generating the reconstructed image by decoding the first encoding to pictorially represent features from the first encoding.

6. The non-transitory computer-readable medium of claim 1, wherein the operations further comprise learning parameters for the classification model by:
   generating a transformed input combination by applying one or more random transformations to the input combination;
   generating a transformation prediction by processing the transformed input combination utilizing the classification model;
   determining a self-supervision loss based on a comparison of the transformation prediction and the one or more random transformations applied to the input combination; and
   updating one or more parameters of the classification model based on the self-supervision loss.

7. The non-transitory computer-readable medium of claim 1, wherein the operations further comprise determining a classification for the input image by:
   generating a classification score for the input image for each known classification of a set of known classifications;
   determining that none of the classification scores meet a predetermined threshold; and
   determining, based on none of the classification scores meeting the predetermined threshold, that the classification for the input image corresponds to the open-set category.

8. The non-transitory computer-readable medium of claim 7, wherein the operations further comprise applying a fallback sequence in response to determining that a classification for the input image corresponds to the open-set category.

9. The non-transitory computer-readable medium of claim 8, wherein the operations further comprise applying the fallback sequence by performing at least one of:
   storing data regarding the input image;
   returning an error message;
   returning a message that the classification for the input image is unknown; or
   requesting, via a graphical user interface, user input to provide a ground truth classification for the input image; and
   updating parameters of the classification model utilizing the ground truth classification for the input image.

10. A system comprising:
    one or more memory components comprising:
       a generative neural network; and
       a classification neural network; and
    one or more processing devices coupled to the one or more memory components to perform operations comprising:
       generating a reconstructed image from an input image by utilizing the generative neural network to:
          encode the input image into a latent space to generate a first encoding; and
          decode the first encoding to regenerate the input image;

generating an input combination of the reconstructed image and the input image by concatenating the reconstructed image and the input image; and determining a classification for the input image that indicates whether the input image depicts content corresponding to one of a set of known classifications or unknown content corresponding to an open-set category by utilizing the classification neural network to:

encode the input combination into a feature space to generate a second encoding that incorporates a disparity between the reconstructed image and the input image; and determine a plurality of classification scores based on the second encoding.

11. The system of claim 10, wherein the operations further comprise determining the classification for the input image corresponds to a known classification based on a classification score for the known classification satisfying a predetermined threshold.

12. The system of claim 10, wherein the operations further comprise determining the classification for the input image corresponds to the open-set category based on each classification score of the plurality of classification scores failing to satisfy a predetermined threshold.

13. The system of claim 10, wherein the operations further comprise learning parameters for the generative neural network by:

determining a generative loss based on a comparison of the reconstructed image and the input image; and updating one or more parameters of the generative neural network based on the generative loss.

14. The system of claim 10, wherein the operations further comprise learning parameters for the classification neural network by:

generating a transformed input combination by applying one or more random transformations to the input combination;

generating a transformation prediction by processing the transformed input combination utilizing the classification neural network;

determining a self-supervision loss based on a comparison of the transformation prediction and the one or more random transformations applied to the input combination; and updating one or more parameters of the classification neural network based on the self-supervision loss.

15. The system of claim 14, wherein the operations further comprise learning the one or more parameters of the classification neural network by:

determining a classification loss based on a comparison of the classification and a ground truth classification; and updating the one or more parameters of the classification neural network based on the classification loss.

16. The system of claim 15, wherein the operations further comprise learning the one or more parameters of the classification neural network by:

applying a first weight to the self-supervision loss and a second weight to the classification loss; and updating the one or more parameters of the classification neural network based on a weighted combination of the self-supervision loss and the classification loss.

17. The system of claim 10, wherein the operations further comprise determining the classification for the input image by:

comparing classification scores for each of the plurality of classification scores;

determining a highest classification score of the plurality of classification scores satisfies a predetermined threshold; and identifying the classification corresponds to the highest classification score.

18. A computer-implemented method comprising:

encoding features from an input image in a vector embedding;

generating, utilizing a generative neural network, a reconstructed image from an input image by decoding the vector embedding to pictorially represent the features in the reconstructed image;

generating an input combination of the reconstructed image and the input image by combining the reconstructed image and the input image;

determining a plurality of classification scores for the input image by analyzing encoded features of the input combination utilizing a classification neural network; and determining a classification for the input image based on the plurality of classification scores that indicates whether the input image depicts content corresponding to a known classification or unknown content corresponding to an open-set category based on a disparity between the reconstructed image and the input image.

19. The computer-implemented method of claim 18, wherein generating the input combination comprises generating a 2n-channel input by concatenating the input image in n-channel form and the reconstructed image in n-channel form.

20. The computer-implemented method of claim 18, wherein determining the classification for the input image comprises:

determining that the classification for the input image corresponds to an open-set category based on the plurality of classification scores failing to satisfy a predetermined threshold; and in response to determining that the classification for the input image corresponds to the open-set category, executing a fallback sequence comprising at least one of:

storing the input image;

returning an error message;

returning a message that the classification for the input image is unknown; or requesting, via a graphical user interface, user input to provide a ground truth classification for the input image; and updating parameters of the classification neural network utilizing the ground truth classification for the input image.

* * * * *